(12) United States Patent
Chehade et al.

(10) Patent No.: US 9,967,459 B2
(45) Date of Patent: May 8, 2018

(54) METHODS FOR BACKGROUND SUBTRACTION USING FOCUS DIFFERENCES

(71) Applicant: Atheer, Inc., Mountain View, CA (US)

(72) Inventors: Mohamed Nabil Hajj Chehade, Los Angeles, CA (US); Sina Fateh, Mountain View, CA (US); Sleiman Itani, East Palo Alto, CA (US); Allen Yang Yang, Richmond, CA (US)

(73) Assignee: Atheer, Inc., Mountain View, CA (US)

( * ) Notice: Subject to any disclaimer, the term of this patent is extended or adjusted under 35 U.S.C. 154(b) by 0 days. days.

(21) Appl. No.: 14/564,007

(22) Filed: Dec. 8, 2014

(65) Prior Publication Data

US 2015/0093022 A1  Apr. 2, 2015

Related U.S. Application Data

(62) Division of application No. 13/786,225, filed on Mar. 5, 2013.
(Continued)

(51) Int. Cl.
*H04N 7/18* (2006.01)
*H04N 5/228* (2006.01)
(Continued)

(52) U.S. Cl.
CPC ....... *H04N 5/23229* (2013.01); *G06K 9/4671* (2013.01); *G06T 7/11* (2017.01);
(Continued)

(58) Field of Classification Search
CPC ............. H04N 5/23212; H04N 5/2356; H04N 5/2352; H04N 13/0495; H04N 5/232;
(Continued)

(56) References Cited

U.S. PATENT DOCUMENTS 5,754,710 A * 5/1998 Sekine et al. ................. 382/300
5,877,809 A * 3/1999 Omata et al. ................. 348/345
(Continued)

OTHER PUBLICATIONS

Nikon_Imaging Products_DSLR Camera Basics_Focal Length and Angle of view, retrieved Apr. 5, 2015.*
(Continued)

*Primary Examiner* — Chia-Wei A Chen
(74) *Attorney, Agent, or Firm* — Mohr Intellectual Property Law Solutions, P.C.

(57) ABSTRACT

First and second images are captured at first and second focal lengths, the second focal length being longer than the first focal length. Element sets are defined with a first element of the first image and a corresponding second element of the second image. Element sets are identified as background if the second element thereof is more in-focus than or as in-focus as the first element. Background elements are subtracted from further analysis. Comparisons are based on relative focus, e.g. whether image elements are more or less in-focus. Measurement of absolute focus is not necessary, nor is measurement of absolute focus change; images need not be in-focus. More than two images, multiple element sets, and/or multiple categories and relative focus relationships also may be used.

24 Claims, 15 Drawing Sheets

Related U.S. Application Data

(60) Provisional application No. 61/720,957, filed on Oct. 31, 2012.

(51) Int. Cl.
*H04N 5/232* (2006.01)
*G06K 9/46* (2006.01)
*H04N 5/225* (2006.01)
*H04N 13/02* (2006.01)
*G06T 7/571* (2017.01)
*G06T 7/11* (2017.01)
*G06T 7/174* (2017.01)
*G06T 7/194* (2017.01)
*G06T 7/557* (2017.01)

(52) U.S. Cl.
CPC ............. *G06T 7/174* (2017.01); *G06T 7/194* (2017.01); *G06T 7/557* (2017.01); *G06T 7/571* (2017.01); *H04N 5/2258* (2013.01); *H04N 5/232* (2013.01); *H04N 5/23212* (2013.01); *H04N 13/0239* (2013.01); *G06T 2207/10004* (2013.01); *G06T 2207/10024* (2013.01)

(58) Field of Classification Search
CPC .............. H04N 5/2258; H04N 13/0264; G06T 7/0069; G06T 2207/10148; G06T 7/0067; G06T 2207/20144; G06T 7/11; G06T 7/12; G06T 7/10; G03B 13/00; G03B 2213/00; G06K 9/00771; G06K 9/6267
USPC ....... 348/42–60, E13.07; 382/181–231, 154; 345/7–9
See application file for complete search history.

(56) References Cited

U.S. PATENT DOCUMENTS

| | | | |
|---|---|---|---|
| 5,917,657 A * | 6/1999 | Kaneko et al. | 359/661 |
| 6,344,930 B1 * | 2/2002 | Kaneko et al. | 359/666 |
| 6,477,260 B1 * | 11/2002 | Shimomura | H04N 13/0239 340/435 |
| 6,522,310 B1 | 2/2003 | Kim et al. | |
| 6,940,473 B2 | 9/2005 | Suyama et al. | |
| 7,057,650 B1 * | 6/2006 | Sakamoto | 348/239 |
| 7,519,907 B2 * | 4/2009 | Cohen et al. | 715/723 |
| 7,653,298 B2 * | 1/2010 | Ono | 396/121 |
| 7,702,229 B2 * | 4/2010 | Schilling-Benz | G03B 13/36 250/201.8 |
| 8,023,000 B2 * | 9/2011 | Tamaru | 348/222.1 |
| 8,170,326 B2 | 5/2012 | Gulati et al. | |
| 8,184,171 B2 * | 5/2012 | Tamaru | 348/218.1 |
| 8,384,803 B2 | 2/2013 | Iizuka et al. | |
| 8,390,729 B2 * | 3/2013 | Long et al. | 348/345 |
| 8,477,232 B2 | 7/2013 | Forutanpour et al. | |
| 8,494,301 B2 * | 7/2013 | Adams, Jr. | 382/255 |
| 8,648,927 B2 | 2/2014 | Kitagawa et al. | |
| 8,675,085 B2 * | 3/2014 | Beckers et al. | 348/218.1 |
| 8,676,085 B1 | 3/2014 | Batori et al. | |
| 8,816,939 B2 | 8/2014 | Border et al. | |
| 8,824,833 B2 * | 9/2014 | Dagher et al. | 382/294 |
| 8,917,296 B2 | 12/2014 | Ichihashi et al. | |
| 8,947,523 B2 * | 2/2015 | Matsui | H04N 5/20 348/106 |
| 9,030,470 B2 * | 5/2015 | Wang et al. | 345/419 |
| 2001/0014215 A1 * | 8/2001 | Ide | G02B 7/34 396/96 |
| 2002/0036693 A1 * | 3/2002 | Kinjo | 348/218 |
| 2002/0126877 A1 * | 9/2002 | Sugiyama | G06K 9/74 382/107 |
| 2003/0020814 A1 | 1/2003 | Ono et al. | |
| 2003/0025821 A1 * | 2/2003 | Bean et al. | 348/345 |
| 2003/0052991 A1 | 3/2003 | Stavely et al. | |
| 2003/0059121 A1 * | 3/2003 | Savakis et al. | 382/239 |
| 2003/0164875 A1 * | 9/2003 | Myers | 348/52 |
| 2004/0080661 A1 * | 4/2004 | Afsenius et al. | 348/345 |
| 2005/0035977 A1 | 2/2005 | Yokoyama et al. | |
| 2005/0104974 A1 * | 5/2005 | Watanabe et al. | 348/222.1 |
| 2006/0014137 A1 * | 1/2006 | Ghosh et al. | 435/4 |
| 2006/0033824 A1 * | 2/2006 | Nicholson | 348/265 |
| 2006/0204077 A1 * | 9/2006 | Lim et al. | 382/154 |
| 2006/0221248 A1 * | 10/2006 | McGuire et al. | 348/587 |
| 2006/0256229 A1 * | 11/2006 | Wernersson | H04N 5/23212 348/348 |
| 2007/0036427 A1 * | 2/2007 | Nakamura | G02B 27/0075 382/154 |
| 2007/0189750 A1 * | 8/2007 | Wong | H04N 5/23212 396/121 |
| 2007/0216796 A1 * | 9/2007 | Lenel et al. | 348/345 |
| 2008/0002878 A1 * | 1/2008 | Meiyappan | 382/154 |
| 2008/0158409 A1 * | 7/2008 | Gotanda | G06K 9/00255 348/348 |
| 2008/0218612 A1 | 9/2008 | Border et al. | |
| 2008/0219493 A1 | 9/2008 | Tadmor | |
| 2008/0285799 A1 * | 11/2008 | Chiu | G06K 9/00805 382/103 |
| 2008/0304013 A1 * | 12/2008 | Seo | 353/8 |
| 2009/0238457 A1 * | 9/2009 | Rittscher et al. | 382/171 |
| 2010/0007759 A1 * | 1/2010 | Watanabe | H04N 5/232 348/222.1 |
| 2010/0033617 A1 * | 2/2010 | Forutanpour | G06T 7/0067 348/345 |
| 2010/0079582 A1 * | 4/2010 | Dunsmore | H04N 5/23219 348/46 |
| 2010/0085462 A1 | 4/2010 | Sako et al. | |
| 2010/0097476 A1 | 4/2010 | Marks et al. | |
| 2010/0128133 A1 * | 5/2010 | Lee | H04N 5/23212 348/208.5 |
| 2010/0128145 A1 | 5/2010 | Pitts et al. | |
| 2010/0128163 A1 | 5/2010 | Nagasaka et al. | |
| 2010/0177403 A1 * | 7/2010 | Dolgoff | 359/629 |
| 2010/0194971 A1 * | 8/2010 | Li | G02B 7/38 348/349 |
| 2010/0245545 A1 | 9/2010 | Ilich-Toay et al. | |
| 2010/0245609 A1 * | 9/2010 | Estevez | 348/222.1 |
| 2010/0254592 A1 * | 10/2010 | Cheng | 382/154 |
| 2010/0295924 A1 | 11/2010 | Miyatani et al. | |
| 2010/0328456 A1 * | 12/2010 | Alakarhu | G01C 3/08 348/139 |
| 2010/0328471 A1 | 12/2010 | Boland et al. | |
| 2010/0328477 A1 * | 12/2010 | Watanabe | H04N 5/232 348/222.1 |
| 2011/0038550 A1 * | 2/2011 | Obrador | 382/225 |
| 2011/0090313 A1 | 4/2011 | Tsuchita et al. | |
| 2011/0141239 A1 | 6/2011 | Kennedy et al. | |
| 2011/0142287 A1 * | 6/2011 | Wong | G06T 7/0069 382/106 |
| 2011/0164816 A1 * | 7/2011 | Guo | 382/165 |
| 2011/0193943 A1 | 8/2011 | Campbell et al. | |
| 2011/0242334 A1 * | 10/2011 | Wilburn et al. | 348/207.1 |
| 2011/0279653 A1 | 11/2011 | Hoshino et al. | |
| 2011/0317000 A1 * | 12/2011 | Lee et al. | 348/79 |
| 2012/0044369 A1 * | 2/2012 | Irisawa et al. | 348/208.4 |
| 2012/0057070 A1 | 3/2012 | Park et al. | |
| 2012/0105594 A1 | 5/2012 | You et al. | |
| 2012/0147206 A1 * | 6/2012 | Onishi | 348/222.1 |
| 2012/0148109 A1 | 6/2012 | Kawamura et al. | |
| 2012/0182393 A1 * | 7/2012 | Yagi | H04N 13/004 348/46 |
| 2012/0195492 A1 * | 8/2012 | Ali | G06T 3/4007 382/154 |
| 2012/0200535 A1 | 8/2012 | Stienstra et al. | |
| 2012/0236120 A1 * | 9/2012 | Kramer et al. | 348/46 |
| 2012/0249550 A1 * | 10/2012 | Akeley et al. | 345/419 |
| 2012/0307018 A1 | 12/2012 | Damstra et al. | |
| 2012/0307108 A1 * | 12/2012 | Forutanpour | 348/231.3 |
| 2012/0314116 A1 * | 12/2012 | Jannard | G03B 13/18 348/333.02 |
| 2012/0320159 A1 * | 12/2012 | Torres et al. | 348/46 |
| 2013/0009955 A1 * | 1/2013 | Woo | H04N 13/0011 345/419 |
| 2013/0038723 A1 | 2/2013 | Tsutsumi et al. | |

(56) References Cited

U.S. PATENT DOCUMENTS

| | | | |
|---|---|---|---|
| 2013/0039568 A1* | 2/2013 | Futawatari | 382/154 |
| 2013/0050432 A1 | 2/2013 | Perez et al. | |
| 2013/0050437 A1 | 2/2013 | Robinson et al. | |
| 2013/0064468 A1* | 3/2013 | Kask et al. | 382/257 |
| 2013/0113988 A1* | 5/2013 | Wajs | 348/362 |
| 2013/0188019 A1 | 7/2013 | Christopher et al. | |
| 2013/0195359 A1 | 7/2013 | Yabu et al. | |
| 2013/0242057 A1 | 9/2013 | Hong et al. | |
| 2013/0258044 A1* | 10/2013 | Betts-Lacroix | 348/36 |
| 2013/0272600 A1* | 10/2013 | Garcia Becerro et al. | 382/154 |
| 2013/0278788 A1 | 10/2013 | Levy | |
| 2013/0286015 A1* | 10/2013 | Robinson | 345/422 |
| 2013/0308032 A1 | 11/2013 | Terashima et al. | |
| 2013/0308036 A1* | 11/2013 | Peng | 348/345 |
| 2014/0002596 A1* | 1/2014 | Antonio et al. | 348/43 |
| 2014/0002606 A1* | 1/2014 | Blayvas et al. | 348/46 |
| 2014/0015933 A1* | 1/2014 | Sato et al. | 348/46 |
| 2014/0056472 A1 | 2/2014 | Gu et al. | |
| 2014/0071241 A1 | 3/2014 | Yang et al. | |
| 2014/0079297 A1* | 3/2014 | Tadayon et al. | 382/118 |
| 2014/0085422 A1* | 3/2014 | Aronsson et al. | 348/46 |
| 2014/0085452 A1 | 3/2014 | Nistico et al. | |
| 2014/0085507 A1 | 3/2014 | Pillman et al. | |
| 2014/0098195 A1* | 4/2014 | Pace et al. | 348/47 |
| 2014/0176673 A1 | 6/2014 | Kennedy et al. | |
| 2014/0201844 A1* | 7/2014 | Buck | 726/26 |
| 2014/0210823 A1 | 7/2014 | Maguire et al. | |
| 2014/0226878 A1* | 8/2014 | Bhagwan et al. | 382/118 |
| 2014/0233847 A1* | 8/2014 | Ratcliff et al. | 382/154 |
| 2014/0267243 A1* | 9/2014 | Venkataraman et al. | 345/419 |
| 2014/0267633 A1* | 9/2014 | Venkataraman et al. | 348/48 |
| 2014/0285660 A1* | 9/2014 | Jamtgaard et al. | 348/143 |

OTHER PUBLICATIONS

Nikon_Imaging Products_DSLR Camera Basics_Minimum Focus Distance, retrieved Apr. 5, 2015.*
Non-Final Office Action dated Apr. 9, 2015, for U.S. Appl. No. 14/563,997 by Chehade et al. filed Dec. 8, 2014.
Non-Final Office Action dated Mar. 11, 2015, for U.S. Appl. No. 13/786,225 by Chehade et al. filed Mar. 5, 2013.
Restriction Requirement dated Oct. 8, 2014, for U.S. Appl. No. 13/786,225 by Chehade et al. filed Mar. 5, 2013.
U.S. Appl. No. 13/786,225 by Chehade et al. filed Mar. 5, 2013.
U.S. Appl. No. 14/549,407 by Itani et al. filed Nov. 20, 2014.
U.S. Appl. No. 14/563,997 by Chehade et al. filed Dec. 8, 2014.
U.S. Appl. No. 14/564,010 by Chehade et al. filed Dec. 8, 2014.
Non-Final Office Action dated Jul. 2, 2015, for U.S. Appl. No. 14/564,010 by Chehade et al. filed Dec. 8, 2014.
Final Office Action dated Dec. 30, 2015, for U.S. Appl. No. 14/563,997 by Chehade et al. filed Dec. 8, 2014.
Final Office Action dated Dec. 9, 2015, for U.S. Appl. No. 13/786,225 by Chehade et al. filed Mar. 5, 2013.
Final Office Action dated Jan. 12, 2016, for U.S. Appl. No. 14/564,010 by Chehade et al. filed Dec. 8, 2014.
Non-Final Office Action dated Sep. 12, 2016, for U.S. Appl. No. 14/563,997 by Chehade et al. filed Dec. 8, 2014.
Non-Final Office Action dated Sep. 14, 2016, for U.S. Appl. No. 14/564,010 by Chehade et al. filed Dec. 8, 2014.
Non-Final Office Action dated Sep. 8, 2013, for U.S. Appl. No. 13/786,225 by Chehade et al. filed Mar. 5, 2013.
Non-Final Office Action dated Jan. 5, 2017, for U.S. Appl. No. 14/549,407 by Itani, S. et al. filed Nov. 20, 2014.

* cited by examiner

METHODS FOR BACKGROUND SUBTRACTION USING FOCUS DIFFERENCES

CLAIM OF PRIORITY

This application is a divisional application of U.S. patent application Ser. No. 13/786,225, titled "METHOD AND APPARATUS FOR BACKGROUND SUBTRACTION USING FOCUS DIFFERENCES", filed Mar. 5, 2013, which claims the benefit of U.S. Provisional Application Ser. No. 61/720,957, titled "NEXT GENERATION DATA NETWORK", filed on Oct. 31, 2012, both of which are incorporated by reference in their entirety.

FILED OF THE INVENTION

This invention relates to the analysis of images. More particularly, this invention relates to identifying objects in and/or regions of an image as being in the background of the image rather than the foreground based on relative focus, and subtracting those objects and/or regions from consideration when analyzing the foreground of the image.

DESCRIPTION OF RELATED ART

Typically, images include objects or features at a range of distances from the device that captures the image (e.g. a camera). A distinction can be made based on the relative distance of different objects or features. Objects or features relatively close to the point of capture can be collectively considered to be in the foreground, while objects or features relatively far away can be collectively considered to be in the background. Likewise, an image itself can be defined into foreground and background regions, based on whether a region of the image contains mostly or entirely objects in the foreground or the background.

Frequently, the nominal subject matter of an image is in the foreground. That is, the subject matter that is intended to be captured is relatively close to the camera (or other image capture system). Excluding unneeded material can reduce the amount of image data that must be analyzed. This is particularly true for cases wherein the unneeded portion of an image represents the majority of the area of that image.

In view of the preceding, there is a need for a simple, efficient method and apparatus for background subtraction.

BRIEF SUMMARY OF THE INVENTION

The present invention contemplates a variety of systems, apparatus, methods, and paradigms for background subtraction.

In one embodiment of the present invention, a method is provided with steps of receiving a first image with a first focal length and a first field of view, and receiving a second image with second focal length longer than said first focal length and a second field of view substantially identical to the first field of view. The method includes defining in the first and second images a plurality of element sets, each element set having a first element of the first image and a substantially corresponding second element of the second image. The relative focus of the first and second elements in the element sets are compared, and those element sets wherein the second element is more in-focus than or substantially equally in-focus as the first element therein are assigned to a background category. The element sets in the background category are subtracted from further analysis.

In another embodiment of the present invention, a method is provided with steps of receiving a plurality of images substantially sharing a field of view, each image having a unique focal length, and determining a sequence of the images by increasing focal length, such that an n+1th image has a longer focal length than an nth image. The method includes defining in the images at least one element set, each said element set having substantially corresponding elements in the plurality of images, and comparing the relative focus of said element set. Element sets are assigned to one of at least one category if relative focus of the sequence of images satisfies a corresponding one of at least one relationship.

The method may include defining a plurality of element sets.

Comparing the relative focus of element sets may include comparing the focus of consecutive elements in the element sets.

The plurality of images may be two images, or may be at least three images.

The category may be a background category representing a background of the field of view. The relationship may be a background relationship such that all n+1th elements in an element set are more in-focus than or substantially equally in-focus as corresponding nth elements in the element set. The relationship may be a background relationship such that all n+1th elements in an element set are more in-focus than corresponding nth elements in the element set.

The category may be a foreground category representing a foreground of the field of view. The relationship may be a foreground relationship such that all n+1th elements in an element set are less in-focus than or substantially equally in-focus as corresponding nth elements in the element set. The relationship may be a foreground relationship such that all n+1th elements in an element set are less in-focus than corresponding nth elements in the element set.

The category may be a midground category representing a midground of the field of view. The relationship may be a midground relationship such that an n+1th element in an element set is more in-focus than or substantially equally in-focus as a corresponding nth element in the element set, and an n+2th element in the element set is less in-focus than or substantially equally in-focus as the n+1th element in the element set. The relationship may be a midground relationship such that an n+1th element in an element set is more in-focus than a corresponding nth element in the element set, and an n+2th element in the element set is less in-focus than the n+1th element in the element set.

The plurality of images may include at least four images, with a first midground category representing a first midground of the field of view and a second midground category representing a second midground of the field of view. The relationship may include a first midground relationship corresponding with the first midground category, such that an n+1th element in an element set is more in-focus than or substantially equally in-focus as a corresponding nth element in the element set, and an n+2th element in the element set is less in-focus than or substantially equally in-focus as the n+1th element in the element set. The relationship may include a second midground relationship such that an m+1th element in an element set is more in-focus than or substantially equally in-focus as a corresponding mth element in the element set, and an m+2th element in the element set is less in-focus than or substantially equally in-focus as the m+1th element in the element set, with n not equal to m.

The plurality of images may include at least four images, with a first midground category representing a first midground of said field of view and a second midground category representing a second midground of said field of view. The relationship may include a first midground relationship such that an n+1th element in an element set is more in-focus than a corresponding nth element in the element set, and an n+2th element in the element set is less in-focus than the n+1th element in the element set. The relationship may include a second midground relationship such that an m+1th element in an element set is more in-focus than a corresponding mth element in the element set, and an m+2th element in the element set is less in-focus than the m+1th element in the element set, with n is not equal to m.

The shortest focal length of the plurality of images may be approximately at least the anticipated distance to a foreground object in the field of view. The shortest focal length of the plurality of images may corresponds to the length of a user's arm. The shortest focal length of the plurality of images may correspond to the maximum extension of a user's hand. The shortest focal length of said plurality of images may be at least 0.5 meters.

Comparing the relative focus of an element set may include comparing the relative degree of edge definition of the element set. Comparing the relative degree of edge definition may include comprises comparing a relative spatial rate of change of an image property. The image property may include comprises pixel gradient. The image property may include brightness. The image property may include color. The image property may include color channel value. The image property may include red channel value, green channel value, or blue channel value; cyan channel value, yellow channel value, magenta channel value, or black channel value.

The images may be captured substantially simultaneously, or may be captured at different times. At least a first of the images may be captured by a first sensor, while at least a second of the images is captured by a second sensor. The field of view may include an intersection of the field of view of the first sensor and the field of view of the second sensor. The first and second fields of view may be substantially identical.

The images may be derived from a plenoptic data set.

The method may include subtracting the element sets assigned to at least one category from further analysis.

In another embodiment of the present invention, an apparatus is provided having a first image sensor with a first focal length and a first field of view, and a second image sensor with a second focal length longer than said first focal length and a second field of view substantially identical to said first field of view. A body has the first and second image sensors disposed thereon, the body being configured to be wearable on user's head, such that the first and second fields of view include a region of space in front of the user, the region of space being with a reach of hands of said user. The apparatus also includes a processor in communication with said sensors. The first image sensor is adapted to capture a first image, and the second sensor is adapted to substantially simultaneously capture a second image. The processor is adapted to define in the first and second images a plurality of element sets, each element set having a first element of the first image and a substantially corresponding second element of the second image. The processor is also adapted to compare the relative focus the first and second elements in the element sets. The processor is adapted to assign to a background category those element sets wherein the second element therein is more in-focus than or substantially equally in-focus as the first element therein, and to subtract element sets assigned to the background category from further analysis.

In another embodiment of the present invention, an apparatus is provided having at least one image sensor, and a processor in communication with the sensor. The image sensor is adapted to capture a plurality of images substantially sharing a field of view, each image having a unique focal length. The processor is adapted to determine a sequence of images of increasing focal length, such that an n+1th image has a longer focal length than an nth image. The processor is also adapted to define in the plurality of images at least one element set, having substantially corresponding elements in the plurality of images. The processor is adapted to compare the relative focus of the element set, and to assign to a category those element sets wherein the relative focus of the sequence of images satisfies a corresponding relationship.

The image sensor may be disposed in a head mounted display.

The apparatus may have first and second image sensors, the first sensor being adapted to capture at least a first of the plurality of images, and the second sensor being adapted to capture at least a second of the plurality of images. The first sensor may be preset to a first focal length, and the second sensor may be preset to a second focal length. The first sensor may have a fixed first focal length, and the second sensor may have a fixed second focal length.

The first and second sensor may be arranged so as to generate stereo image pairs.

The apparatus may include a beam splitter, wherein the beam splitter and the first and second sensors are arranged such that the field of view of the first sensor is substantially identical to the field of view of the second sensor.

The first and second sensors may be arranged proximate one another and substantially aligned, such that the field of view of the first sensor is substantially identical to the field of view of the second sensor.

The first and second sensors may be adapted to capture first and second images substantially simultaneously.

The image sensor may be a plenoptic imager, the plenoptic imager being adapted to capture the plurality of images with unique focal lengths in a plenoptic data set.

The image sensor may be a variable focal-length sensor.

The image sensor captures all of the plurality of images.

In another embodiment of the present invention, an apparatus is provided having means for receiving a plurality of images substantially sharing a field of view, each image having a unique focal length, and means for determining a sequence of images of increasing focal length, such that an n+1th image has a longer focal length than an nth image. The apparatus includes means for defining in the plurality of images at least one element set, the element set having substantially corresponding elements in the plurality of images, and means for comparing the relative focus of the element set throughout the sequence of images of increasing focal length. The apparatus further includes means for assigning to one of at least one category those element sets wherein the relative focus of the sequence of images satisfies a corresponding one of at least one relationship.

BRIEF DESCRIPTION OF THE SEVERAL VIEWS OF THE DRAWINGS

Like reference numbers generally indicate corresponding elements in the figures.

DETAILED DESCRIPTION OF THE INVENTION

Figure 1:
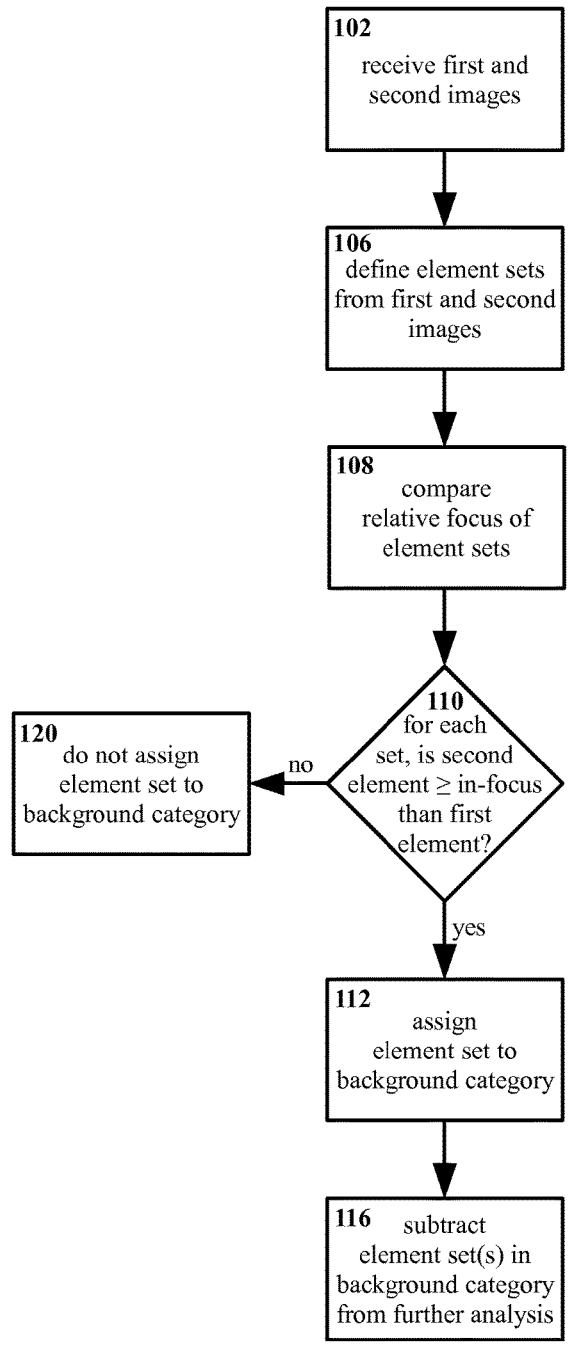
FIG. 1 shows a flow chart of an embodiment of a method in accordance with the present invention.

Referring to FIG. 1, a flow chart illustrating a method for image analysis is shown therein. In the method as shown, first and second images are received 102. The first and second images have first and second focal lengths respectively, with the second focal length (of the second image) being longer than the first focal length (of the first image). The first and second images also have first and second fields of view respectively. The first and second fields of view are substantially identical.

Next, a plurality of element sets are defined 106. An element set includes a region, pixel, feature, etc. in each image. Thus, for the first and second images in the method of FIG. 1, each element set includes a first element from the first image, and a second element from the second region substantially corresponding to the first element in the first image. That is, the first element is a region, pixel, feature, etc. in the first image, and the corresponding second element is a corresponding region, pixel, feature, etc. in the second image.

With element sets defined 106, the relative focus of the element sets is compared 108. For the method of FIG. 1, with first and second images, the relative focus of the first element is compared to the relative focus of the second element within each element set.

For each element set, a determination is made 110 as to whether the second element therein is more in-focus than, substantially as in-focus as, or less in-focus than the first image.

It is emphasized that it is not necessary to determine the absolute degree of focus of elements in individual images, nor is it necessary for elements in either or both of the images to be in-focus. Moreover, it is not necessary to measure how much the degree of focus changes between a first element from a first image and a second element from a second image. It is only necessary to determine the relative focus, in terms of whether focus improves, stays substantially the same, or worsens between the first and second elements in the element set.

With regard to step 110, if for any element set the second element therein is more in-focus than or substantially as in-focus as the first element therein, then that element set is assigned 112 to a background category. In less formal terms, that portion of the first and second images represented by the element set being evaluated may be considered to be part of the background of those images.

Element sets assigned to the background category are subtracted 116 from further analysis. That is, any further processing that might be done on one or both of the first and second images would ignore those regions represented by element sets that had been determined to be background. In this manner, with the background of the field of view having been identified and excluded, further image processing can be applied more specifically to content in the foreground of the field of view, so as to reduce processing load, reduce processing time, simplify necessary calculations, etc.

Again with regard to step 110, if for any element set the second element therein is not more in-focus than or substantially as in-focus as the first element (i.e., the second element is less in-focus than the first element), then that element set is not assigned 120 to the background category.

Figure 2:
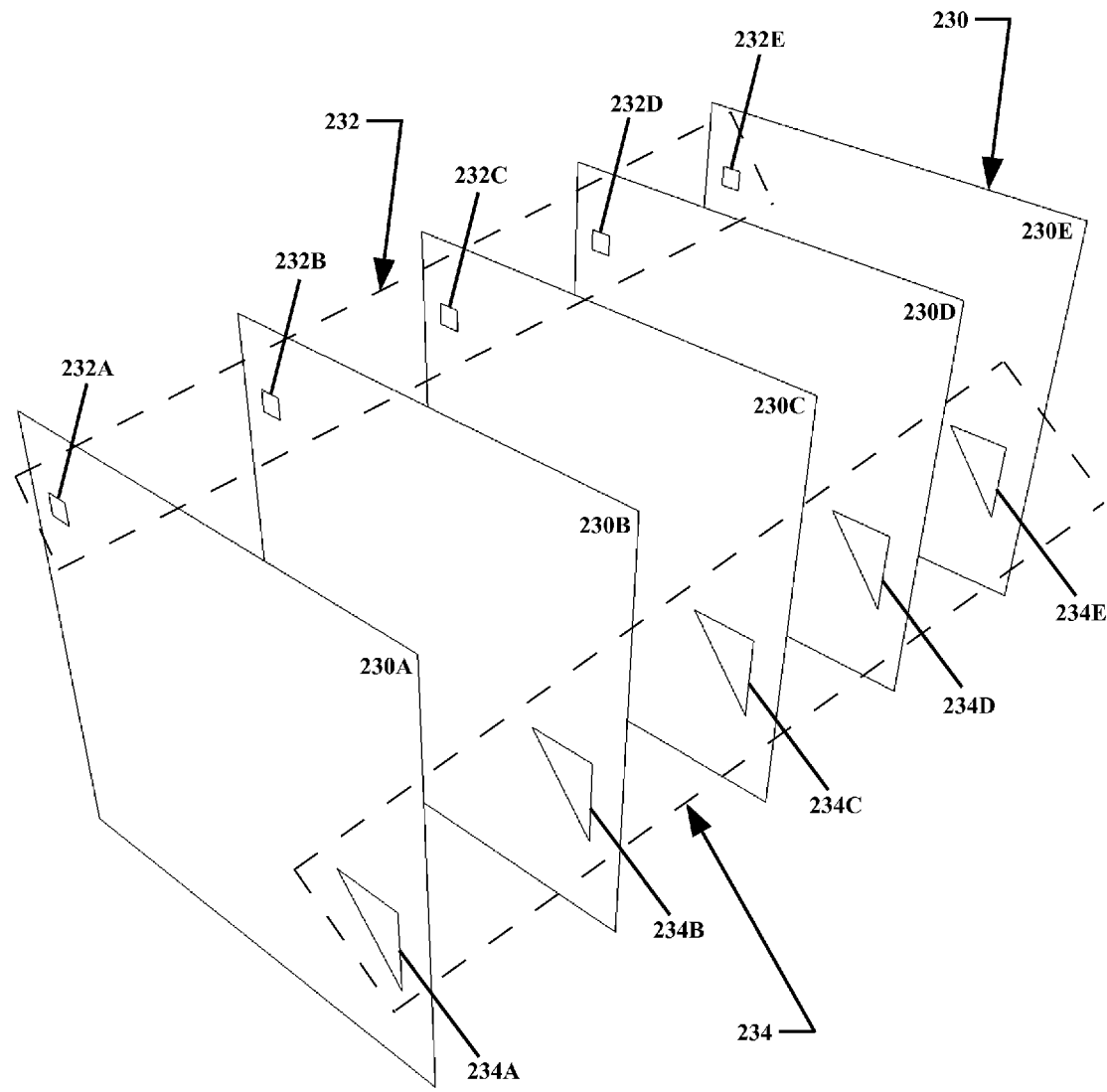
FIG. 2 shows an arrangement of element sets defined across a sequence of images.
Figure 3:
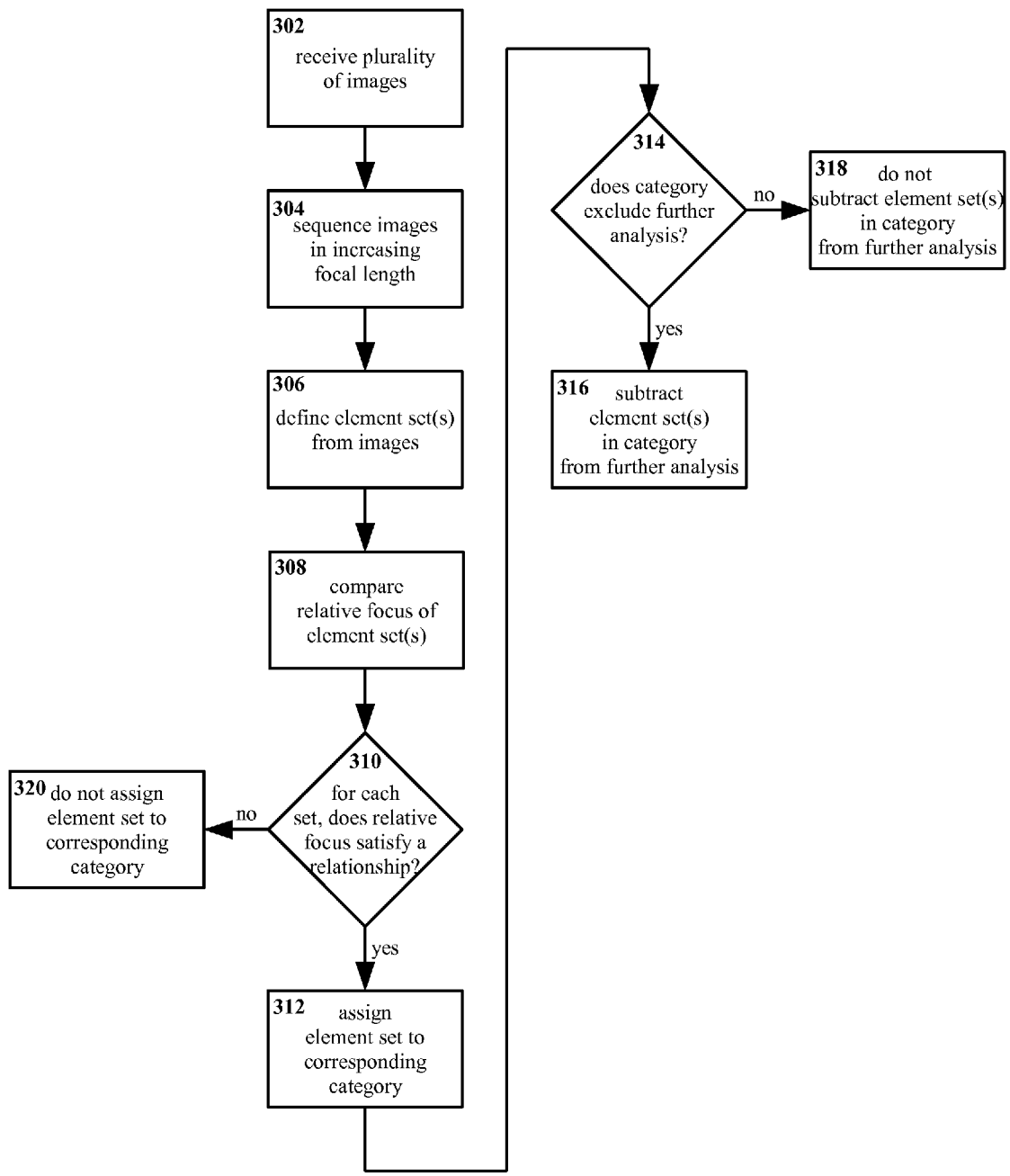
FIG. 3 shows a flow chart of another embodiment of a method in accordance with the present invention.

Although the method shown in FIG. 1 utilizes only two images, this is an example only, and arrangements with more than two images may be equally suitable for some embodiments (an example of such being provided in FIG. 3). Thus, although the element sets referenced with regard to FIG. 1 each included two elements, element sets in general may include more than two corresponding elements. For example, FIG. 2 shows an arrangement of images that illustrate the arrangement of element sets, wherein the example element sets each include five elements therein.

In FIG. 2, a sequence 230 of images is shown, including five individual images 230A, 230B, 230C, 230D, and 230E. Each image 230A, 230B, 230C, 230D, and 230E in the sequence 230 has a unique focal length. Although focal length is not explicitly illustrated in FIG. 2, for purposes of explanation it may be useful to consider the images 230A, 230B, 230C, 230D, and 230E as having been arranged in order of increasing focal length, i.e. 230E has a longer focal length than 230D which has a longer focal length than 230C etc. More generally, the sequence 230 is arranged such that an n+1th image in the sequence 230 has a longer focal length than an nth image therein.

As noted, two element sets 232 and 234 are shown in FIG. 2. The use of two element sets 232 and 234 is an example only; any number of element sets, from one element set to an arbitrarily large number of element sets, may be suitable for certain embodiments.

Each element set 232 and 234 includes substantially corresponding elements in the sequence 330 of images. As shown, the individual elements 232A, 232B, 232C, 232D, and 232E in element set 232 are located in substantially the same position in each of images 230A, 230B, 230C, 230D, and 230E; elements 232A, 232B, 232C, 232D, and 232E in element set 232 are also substantially the same shape and size as one another. Similarly, individual elements 234A, 234B, 234C, 234D, and 234E in element set 234 are located in substantially the same position in each of images 230A, 230B, 230C, 230D, and 230E, and elements 234A, 234B, 234C, 234D, and 234E in element set 234 are also substantially the same shape and size as one another. Thus, the element sets 232 and 234 represent substantially corresponding regions, features, pixels, etc. in the sequence 230 of images.

It is noted that element sets may vary considerably in terms of shape, size, position, configuration, manner of definition, etc. As shown in FIG. 2 for example, element sets 232 and 234 are visibly different in shape, size, and position. Element sets may represent individual pixels, groups of pixels, geometric shapes, or visible features within a field of view. Examples of visible features might include patches having a color value, brightness value, or other image property within a given range, or features identified previously (e.g. using recognition algorithms) as being objects such as faces, hands, trees, etc. However, these are examples only, and other arrangements may be equally suitable.

Turning to FIG. 3, a flow chart illustrating another method for image analysis is shown therein. While the method of FIG. 3 in some ways resembles that of FIG. 1 as described previously, the method of FIG. 3 is more general, for example including the possibility of arrangements using more than two images.

In the method as shown in FIG. 3, a plurality of images is received 302. Each of the images has a unique focal length. The images substantially share a field of view, that is, the field of view of the images is substantially identical.

The plurality of images is sequenced 304 in order of increasing focal length. That is, for two images n and n+1 in the sequence, the focal length of the n+1th image is longer than the focal length of the nth image.

At least one image set is defined 306 from the sequence of images. Individual elements include regions, pixels, features, etc. in individual images, and each element set includes substantially corresponding elements in the plurality of images. That is, the elements in an element set are substantially corresponding regions, pixels, features, etc. throughout the sequence of images.

With element sets defined 306, the relative focus of the element sets is compared 308. That is, elements within each element set are compared with one another with regard to relative focus. Comparisons may vary from one embodiment to another. For example, for some embodiments comparisons may be made between consecutive elements in an element set, i.e. the relative focus of each element n with a corresponding element n+1 in the element set. However, other arrangements may be equally suitable. It should be understood that the precise comparisons done may depend to at least some degree on the particular relationship under consideration for each relevant category (see below).

For each element set, a determination is made 310 as to whether the relative focus thereof satisfies a particular relationship. For example, one such relationship might be that for the elements in the element set, all n+1th elements are more in-focus than or substantially as in-focus as corresponding nth elements therein.

It is again emphasized that it is not necessary to determine the absolute degree of focus of elements in individual images, nor is it necessary for elements in images to be in-focus, nor is it necessary to measure how much the degree of focus changes. It is only necessary to determine the relative focus, in terms of whether the focus improves, stays substantially the same, or worsens among elements of an element set.

Again with regard to step 310, if the relative focus of any element set satisfies the relationship under consideration, then that element set is assigned 312 to a category corresponding to the relationship under consideration.

It is noted that although for clarity FIG. 3 shows only one such determination 310 and shows element sets assigned 312 to only one such category, this is an example only. For some embodiments it may be equally suitable to establish two or more categories and/or two or more focus relationships, and to make multiple determinations regarding whether the relative focus of each element set satisfies relationships corresponding with the categories.

Following assignment 312 of any element sets satisfying the relevant relationship to a corresponding category, it is further determined 314 whether the corresponding category to which the element sets have been assigned excludes further analysis of those element sets so assigned. If so, those element sets assigned to the corresponding category are subtracted 316 from further analysis. If not, the element sets are not subtracted 318 from further analysis.

It is noted that steps 314, 316, and 318 are optional. For certain embodiments such as the one illustrated, it may be useful to exclude certain element sets from further processing based on the relative focus of those element sets. However, not all categories into which element sets may be assigned will necessarily call for exclusion of element sets from further analysis. For some embodiments, there may be no category for which elements assigned thereto are required to be subtracted from further analysis. For such embodiments, step 314 would default to "no", making step 314 and steps 316 and 318 that follow from step 314 unnecessary.

Returning to step 310, still with regard to FIG. 3, element sets that do not satisfy a particular relative focus relationship are not assigned 320 to a category corresponding to that relationship.

At this point a discussion of relative focus as applied to objects appearing in the fields of view of the first and second images may be illuminating. With regard to the method in FIG. 1, element sets are categorized as background if the second element therein is more in-focus than or substantially as in-focus as the first element therein.

Figure 4A:
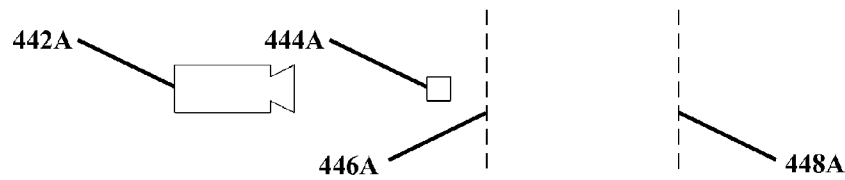
FIG. 4A through FIG. 4G show schematic arrangements of an image sensor with target objects at various positions relative to focal lengths.

FIG. 4A shows a schematic arrangement of an image sensor 442A, a target object 444A, a first focal length 446A for the image sensor 442A, and a second focal length 448A for the image sensor 442A, the second focal length 448A being longer than the first focal length 446A. FIG. 4B through FIG. 4G show similar arrangements, but with the object 444B through 444G at different positions.

With regard to FIG. 4A through FIG. 4G, consider the relative focus of the target object 444A through 444G in a first image obtained at the first focal length 446A through 446G and at the second focal length 448A through 448G.

In FIG. 4A, it will be observed that the distance between the image sensor 442A and the target object 444A is less than the distance between the image sensor 442A and the first focal length 446A. However, when considering relative focus the relevant distances are the distance from the target object 444A to the first focal length 446A and the distance from the target object 444A to the second focal length 448A. By inspection, the distance from the target object 444A to the first focal length 446A is less than the distance from the target object 444A to the second focal length 448A. Therefore, the target object 444A will be more in-focus in a first image taken at the first focal length 446A than in a second image taken at the second focal length 448A. In other words, the target object 444A is less in-focus in the second image than in the first image.

Figure 4B:
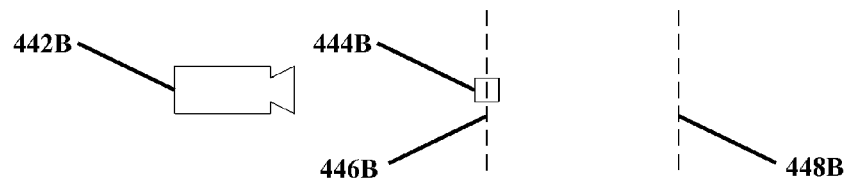

In FIG. 4B, the distance from the target object 444B to the first focal length 446B is again less than the distance from the target object 444B to the second focal length 448B. Therefore, the target object 444B will be more in-focus in a first image taken at the first focal length 446B than in a second image taken at the second focal length 448B; the target object 444B is less in-focus in the second image than in the first image. While it may be observed that the target object 444B in FIG. 4B is shown directly aligned with the first focal length 446B, this is not significant in determining relative focus; as has been previously noted, the absolute focus is not of importance. The difference in degree of focus for two (or more) focal lengths is of concern, not how well or how poorly an object or element may be in-focus at an individual focal length.

Figure 4C:
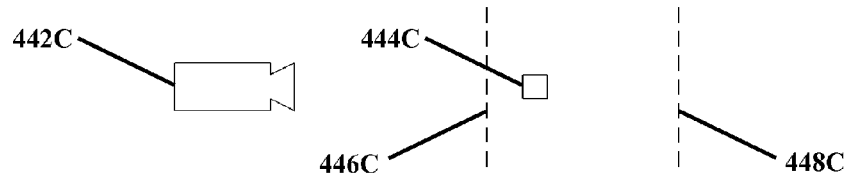

In FIG. 4C, the distance from the target object 444C to the first focal length 446C is still less than the distance from the target object 444C to the second focal length 448C. Again, the target object 444C will be more in-focus in a first image taken at the first focal length 446C than in a second image taken at the second focal length 448C; the target object 444C is less in-focus in the second image than in the first image.

Figure 4D:
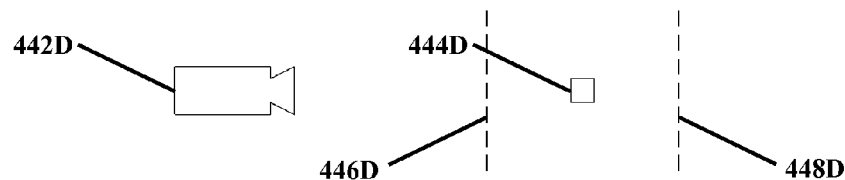

In FIG. 4D, the distance from the target object 444D to the first focal length 446D is substantially the same as the distance from the target object 444D to the second focal length 448D. Thus, the target object 444D will substantially as in-focus in a first image taken at the first focal length 446D as in a second image taken at the second focal length 448D. For FIG. 4D, the target object 444C substantially as in-focus in the second image as in the first image.

Figure 4E:
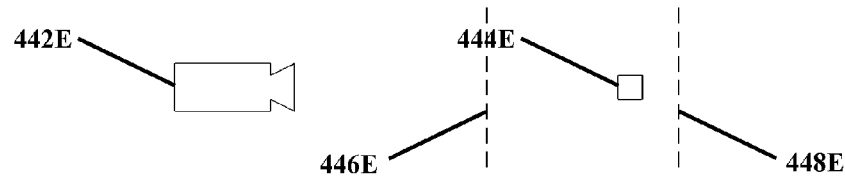

In FIG. 4E, the distance from the target object 444E to the first focal length 446E is now visually greater than the distance from the target object 444E to the second focal length 448E. Thus, the target object 444E will be less in-focus in a first image taken at the first focal length 446E than in a second image taken at the second focal length 448E; the target object 444E is more in-focus in the second image than in the first image.

Figure 4F:
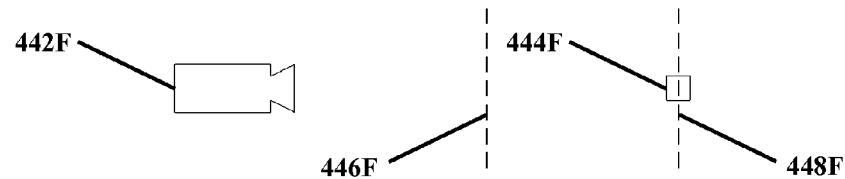

In FIG. 4F, the distance from the target object 444F to the first focal length 446F is again greater than the distance from the target object 444F to the second focal length 448F. The target object 444F is again less in-focus in a first image taken at the first focal length 446F than in a second image taken at the second focal length 448F; the target object 444F is more in-focus in the second image than in the first image.

Figure 4G:
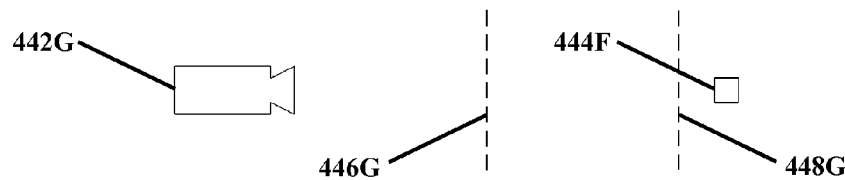

Finally in FIG. 4G, the distance from the target object 444G to the first focal length 446G is still greater than the distance from the target object 444G to the second focal length 448G. The target object 444G remains less in-focus in a first image taken at the first focal length 446G than in a second image taken at the second focal length 448G; the target object 444G is more in-focus in the second image than in the first image.

Based on the relative focus of a target object 444A through 444G as shown in FIG. 4A through FIG. 4G, it is possible to devise relationships such that using images taken at different focal lengths, a distance of an object, feature, etc. can be approximated relative to those different focal lengths. For example, with reference to FIG. 4A through FIG. 4G, consider a target object 444A through 444G that is no closer to the image sensor 442A through 442G than a midpoint between the first focal length 446A through 446G and the second focal length 448A through 448G. Under such conditions, a second image taken at the second focal length 448A through 448G will be more in-focus than or substantively as in-focus as a first image taken at the first focal length 446A through 446G.

Conversely, given a first image taken at a first focal length 446A through 446G and a second image taken at a second focal length 448A through 448G, with the second focal length 448A through 448G being longer than the first focal length 446A through 446G, an object that is at least as distant from the image sensor 442A through 442G as the midpoint between the first focal length 446A through 446G and second focal length 448A through 448G will be more in-focus or substantively as in-focus in the second image as compared to the first image.

With such behavior, it is possible, for example, to select a first focal length 446A through 446G and a second focal length 448A through 448G such that a midpoint between the first focal length 446A through 446G and a second focal length 448A through 448G may serve as a boundary beyond which objects in the field of view may be considered to be "in the background". For certain applications, background objects may then be excluded from further consideration and/or analysis.

The preceding is an example only. Other arrangements, including but not limited to arrangements that distinguish a foreground and/or one or more midground categories, may be equally suitable for certain embodiments. Additional examples of some such suitable arrangements are described later herein.

Figure 5:
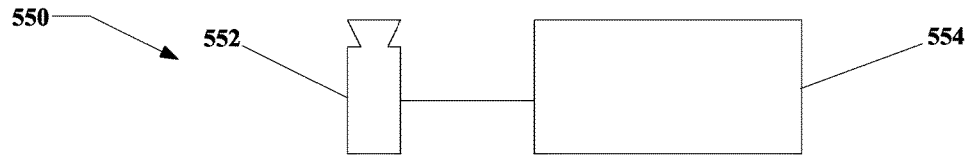
FIG. 5 shows a schematic illustration of an embodiment of an apparatus in accordance with the present invention.

Referring to FIG. 5, an embodiment of an apparatus 550 in accordance with the present invention is shown. The apparatus 550 includes an image sensor 552, and a processor 554 in communication with the sensor 552.

A range of image sensors 552, including but not limited to CMOS and CCD digital cameras, may be suitable. Moreover, sensors other than cameras also may be equally suitable. Also, although FIG. 5 shows only one sensor, the use of two or more sensors may be suitable for some embodiments. Likewise, a range of general-purpose, special-purpose, and embedded systems may be suitable for use as the processor 554. It may also be suitable for the processor 554 to be physically integrated with the sensor or sensors 552. Moreover, it may be equally suitable for the processor 554 to consist of two or more physical or logical processor components. Additionally, the manner by which communication between the sensor 552 and the processor 554 is established may vary from one embodiment to another; in the embodiment illustrated the components are shown to communicate by direct wire connection, but other arrangements may be equally suitable.

Figure 6:
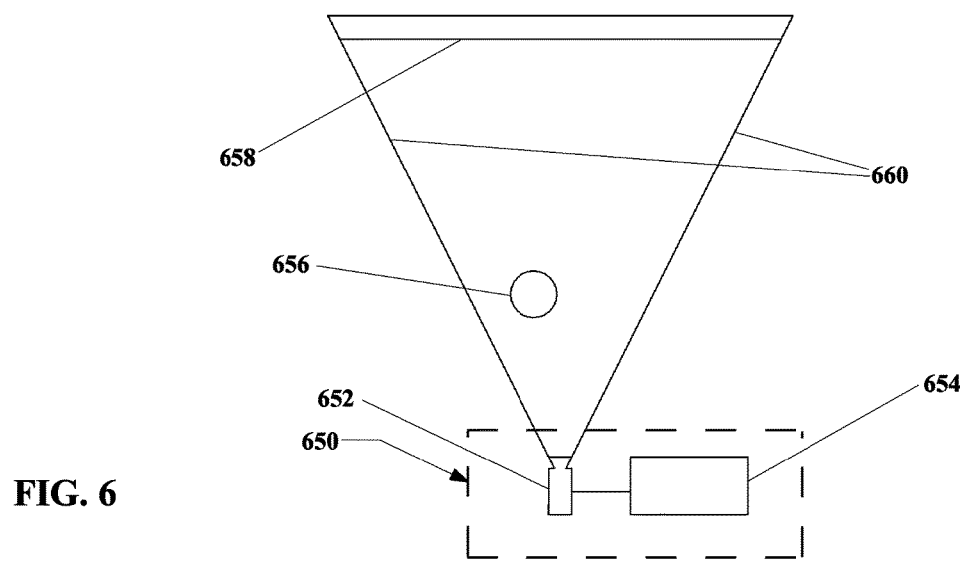
FIG. 6 shows a schematic illustration of an embodiment of an apparatus in accordance with the present invention, in an example environment.

FIG. 6 shows an embodiment of an apparatus 650 in accordance with the present invention, positioned so as to capture images from the environment around the apparatus 650. The apparatus 650 includes an image sensor 652, and a processor 654 in communication with the sensor 652.

A subject 656 is shown disposed in front of the sensor 652 of the apparatus 650. This represents an object or objects that would appear in the foreground of an image taken by the sensor 652. Similarly, a more distant background 658 is also shown, to represent an object or objects that would appear in the background of an image taken by the sensor 652. The field of view 660 of the sensor 652 is shown encompassing the subject 656 and the background 660.

For simplicity, both the subject 656 and the background 658 are shown here as single, well-defined objects, but in practice either or both may be more complex, consisting of several to many objects, at different distances and with complicated geometries. In particular, although the distance to the background 658 is shown as finite and generally uniform for clarity, in practice the distance between the sensor 652 and the background 658 may be highly variable, and may be for focusing purposes infinite or near-infinite (e.g. if the background includes distant mountains, stars, etc.).

It is noted that the simple arrangement shown in FIG. 6 is an example only. The invention is not restricted to a particular configuration, nor to a particular environment, and may be utilized in a broad range of devices and environments.

Figure 7:
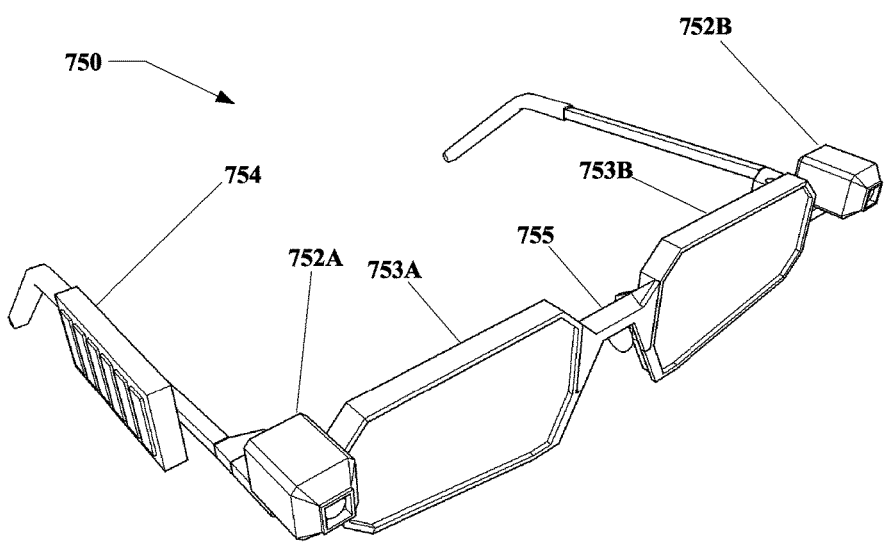
FIG. 7 shows an embodiment of an apparatus in accordance with the present invention, in the form of a head mounted display.

Embodiments of the present invention may be suitable for mounting on, incorporation into, and/or use with a wide range of devices and methods. For example, an apparatus 750 is shown in FIG. 7 in the form of a head-mounted display. As shown, the apparatus 750 includes a processor 754 and two sensors 752A and 752B, either or both of which could serve in the manner described herein. In addition, the apparatus 750 includes a body 755 in the form of a frame for a head mounted display; as shown the body 755 resembles a pair of glasses, but this is an example only, and other configurations may be equally suitable. The apparatus also includes two displays 753A and 753B.

The displays 753A and 753B are mounted to the body 755, with the body 755 being configured and the displays 753A and 753B being mounted such that when a user wears the apparatus 750, the displays 753A and 753B are disposed proximate to and substantially aligned with the user's eyes. Likewise, the sensors 752A and 752B mounted to the body 755 such that when a user wears the apparatus 750 the fields of view of the sensors 752A and 752B include a region in front of the user, e.g. where the user would execute hand motions as input, with the apparatus for example removing background for gesture recognition. In the arrangement of FIG. 7, the processor 754 is also mounted to the body 755.

However, such an arrangement is presented as an example only, and other embodiments may be equally suitable.

The configuration shown is an example only, and many variations may be possible. For example, for embodiments of a head mounted display with multiple sensors 752A and 752B, one or more sensors may be disposed on the head mounted display, with one or more other sensors arranged elsewhere. The processor 754 likewise may be disposed on the head mounted display, in addition to or instead of the sensor or sensors. In addition, the use of a head mounted display is itself an example only, and other arrangements may be equally suitable.

Figure 8:
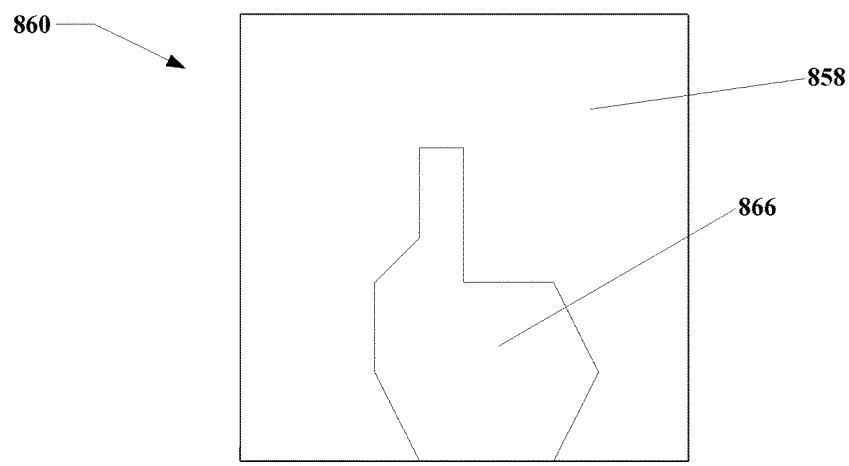
FIG. 8 shows a schematic illustration of the field of view of a sensor image in accordance with the present invention.

FIG. 8 shows a schematic view of the field of view 860 as might be visible to the sensor of an embodiment of an apparatus in accordance with the present invention. A subject 856 is visible therein in the field of view 860, along with a background 858. For explanatory purposes, a subject 856 is shown with a relatively complicated geometry, similar to that of a human hand with one finger extended, but this is an example only.

FIG. 4 shows field of view 960 as might be visible to a sensor 952 in an apparatus in accordance with the present invention, as divided into geometric elements 962. For simplicity, no subject object or background are shown. If collected over multiple images, the elements 962 might be assembled into element sets. As illustrated, elements 962 are geometric, with the field of view 960 divided into a five-by-five matrix of square elements 962, so that the entirety of the field of view 960 is in one or another element 962.

However, in practice more or fewer elements 962 may be used. Moreover, matrices of configurations other than square or rectangular, and/or elements 962 of shapes other than square or rectangular, may be equally suitable for some embodiments. Likewise, arrangements of elements 962 that do not fully cover the field of view 960 may also be suitable.

In addition, the use of spatially defined elements 962 is itself an example, and other arrangements may be equally suitable. For example, for some embodiments features within the images themselves may be identified for analysis, in addition to or instead of dividing the images geometrically, and those features analyzed as elements similarly to the elements 962 shown in FIG. 9. For example, features such as edges, outlines, colored regions, tracking lights or markers, etc., could be utilized as elements and so analyzed. Such an arrangement could, for example, be used to identify and track a an object such as a hand or stylus. Feature-based elements could be used in addition to or in place of the approach of defining the field of view geometrically into elements.

Figure 9:
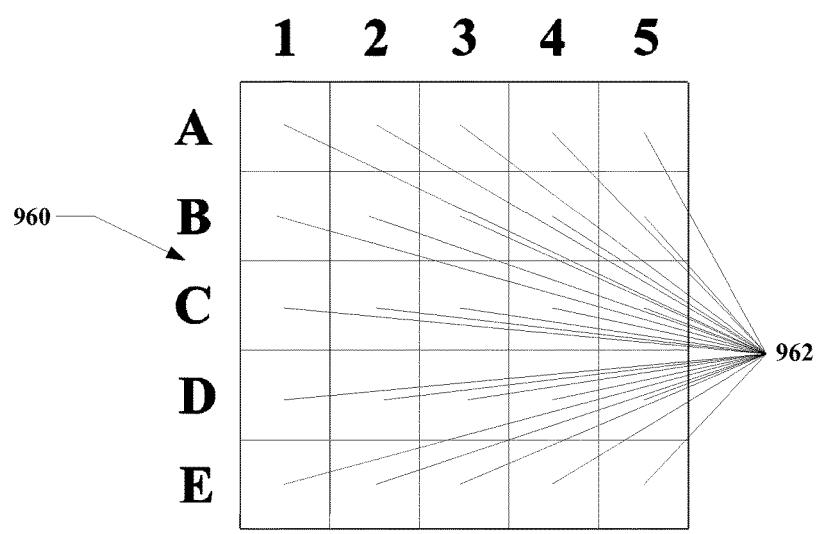
FIG. 9 shows the field of view of a sensor divided into regions.

Although for purposes of description the elements 962 shown in FIG. 9 (and some others) are depicted as being geometric regions, it is to be understood that other types of elements, including but not limited to image features, may be equally suitable.

Figure 10A:
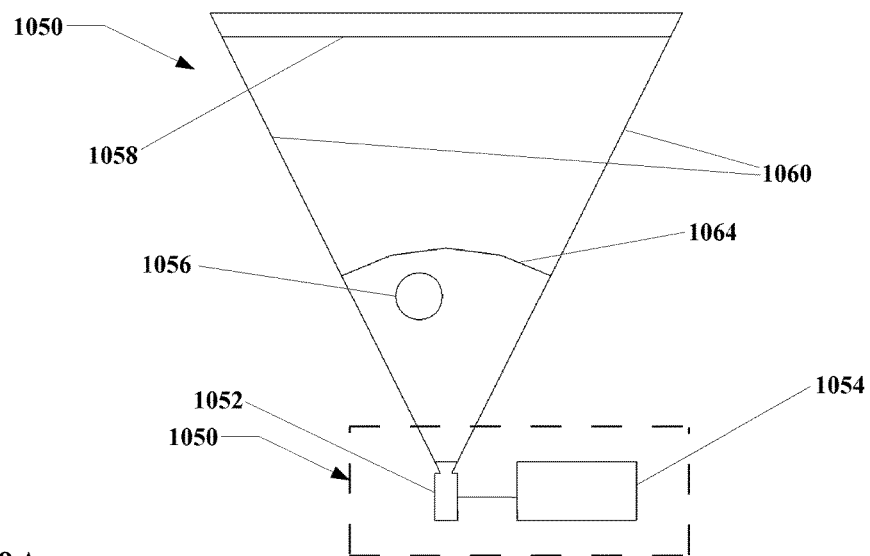
FIG. 10A through FIG. 10C show a schematic illustration of an embodiment of an apparatus in accordance with the present invention in an example environment using various focal lengths.
Figure 10B:
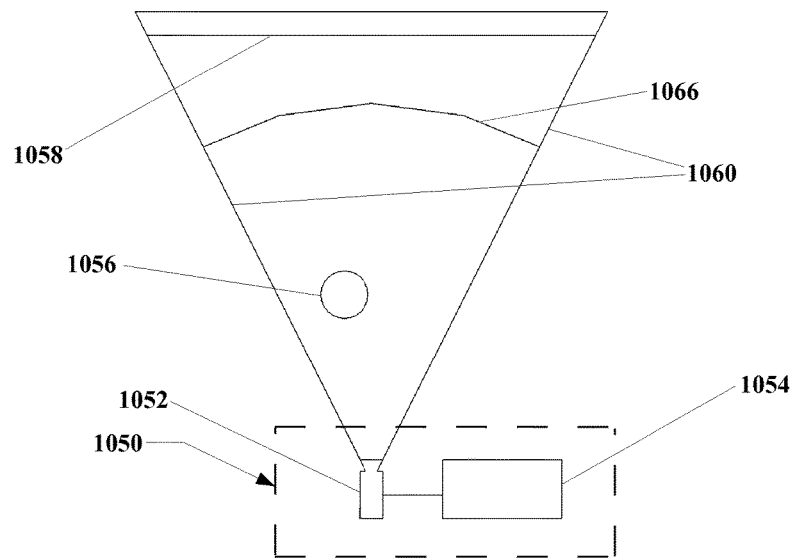

Referring now to FIG. 10A and FIG. 10B, the sensor 1052 captures at least two images, where for any two images n and n+1 of those at least two images, the focal length of image n+1 is longer than the focal length of image n. For clarity, the following discussion concentrates mainly on a concrete case wherein first and second images are taken at first and second focal lengths, the second focal length being longer than the first focal length. However, this is an example only, and the present invention is not limited only to arrangements using only first and second images.

It also is noted that images n+1 and n, though they may be compared as a pair, need not be taken in succession. That is, the images could be taken starting with the longest focal length first, or in any arbitrary order. In other words, the ordering of images by focal length, such that image n is paired to image n+1 wherein image n+1 has a longer focal length than image n, can take place after the images are taken.

Also, the comparison of a particular image in a given pair does not exclude that image from being compared as part of a different pair. More concretely, a first image could be compared to a second image and/or to a third image, so long as both the second image and third image have focal lengths longer than that of the first image. Both pairings, first with second and first with third, would constitute a pairing of n with n+1; it is not necessary that compared images be "adjacent" or consecutive in terms of focus.

Likewise, the use of the comparisons specified do not exclude the use of other comparisons. In particular, with a plurality of images, more complex comparisons may be equally suitable, including but not limited to comparisons of groups of images larger than pairs.

For the simple case of two images at two focal lengths, shown in FIG. 10A and FIG. 10B, the sensor 1052 captures a first image at a first focal length 1064, and a second image at a second focal length 1066, wherein the second focal length 1066 is greater than the first focal length 1064. In some embodiments, the first focal length 1064 may be of a distance that is approximately at or that is beyond the distance to the subject 1056. For many applications the distance of the subject 1056 can be estimated in some manner applicable to the particular embodiment, and because the first focal length 1064 is not particularly limited with respect to any required distance beyond the subject 1056, such estimates need not be precise. Alternatively, simple but low-precision approaches for measuring the distance to the subject 1056 may be equally suitable for some embodiments, since as already noted the distance to the subject 1056 need not be known with high precision.

It will be understood that that a suitable distance for the first focal length 1064 will depend to some degree on the specific application for an invention in accordance with the present invention, and thus will vary from embodiment to embodiment and application to application. However, in one embodiment adapted to exclude background from images for gesture recognition, the first focal length 1064 is of a distance comparable to the extended length of the user's arm. Alternatively, the first focal length 1064 may be comparable to the maximum range of motion of the user's hand(s). In more concrete terms, the first focal length 1064 may be at least 0.5 meters.

After the first and second images are captured, the focus of the first image is compared to the focus of the second image. More specifically, as described previously, element sets defined with a first element of the first image and a corresponding second element of the second image, are compared for relative focus. This is a differential or relative comparison; that is, the difference in focus is of interest, not the focus itself. It is again emphasized that the present invention does not require bringing images or elements thereof into proper focus, or otherwise measuring or calculating the distance at which they would be in focus. Rather, a change in the degree to which the first and second images are in-focus is sufficient for the operation of the present invention, regardless of the absolute focus of the images.

Considering FIG. 10A, as illustrated the first focal length 1064 is slightly greater than the distance to the subject 1056, but less than the distance to the background 1058. Since the focal length does not match either the distance to the subject 1056 or the background 1058, both the subject and the background are out-of-focus.

Considering next FIG. 10B, the second focal length 1066 is greater than the first focal length 1064, and so is even farther beyond the subject 1056. However, the second focal length 1066 is closer to the background 1058 than was the first focal length 1064.

Thus, the subject 1056 is less in-focus in the second image than in the first image, but the background 1058 is more in-focus in the second image than in the first image. This change in relative focus between the first and second images—the subject 1056 becomes less in-focus, while the background 1058 becomes more in-focus—provides a criterion by which the background 1058 can be distinguished from the subject 1056.

The preceding description is presented as an example, and other arrangements may be equally suitable.

For example, so long as the difference between the focal length and the distance to the subject 1056 is greater in the second image than in the first image, it is not necessary for the first focal length to be greater than the distance to the subject 1056.

Figure 10C:
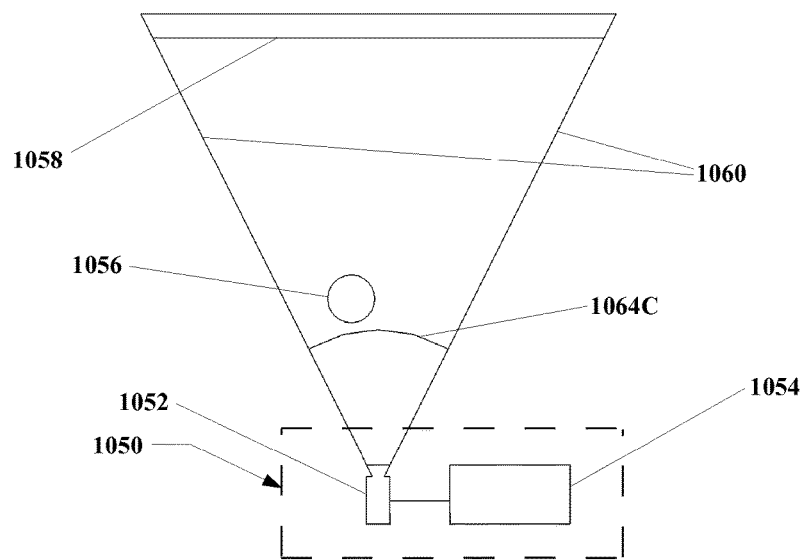

Such a case is shown in FIG. 10C with an alternate first focal length 1064C. Therein, the first focal length 1064A is less than the distance to the subject 1056. However, with reference also to FIG. 10B again, the distance between the subject 1056 and the first focal length 1064C in FIG. 10C is less than the distance between the subject 1056 and the second focal length 1066 in FIG. 10B. As a result, the subject 1056 still is less in-focus in the second image than in the first image, since the subject 1056 is less in-focus at the second focal length 1066 than at the first focal length 1064C.

In general, it is not necessary for either a subject or a background to be fully in-focus in absolute terms in either a first or a second image, although being in-focus is permissible. Nor is it necessary to measure or otherwise determine the actual distance to the subject or the background. Rather, the factor under consideration is the change in the degree to which the subject and the background are in focus. In accordance with the present invention, a (relatively close) subject will be less in-focus in the second image than the first (i.e. less in-focus at the second focal length than at the first), while a background will be more in-focus in the second image than in the first.

Figure 11:
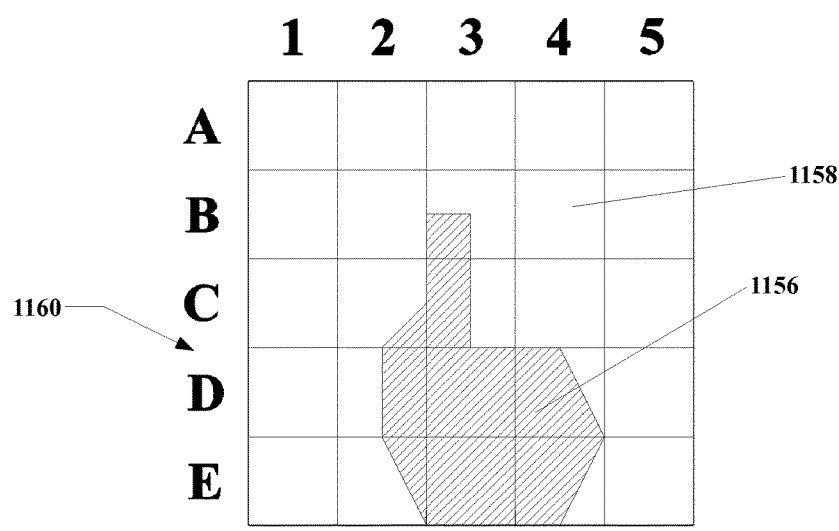
FIG. 11 shows the field of view of a sensor with focal information.

Referring now to FIG. 11, once the first and second images are captured, the element sets defined from the first and second images are evaluated to determine the relative degree of focus between them. FIG. 11 shows a comparison of the relative degree of focus between the first and second images for element sets across the field of view 1160 of a sensor in an apparatus according to the present invention. The hatched area shown in FIG. 11 represents a portion of the image that is less in-focus in the second image than in the first image. That is, the hatched portion is representative of a subject 1156 (as opposed to a background 1158). The view in FIG. 11 is shown divided into elements which are grouped as element sets, as previously described. However, FIG. 11 is illustrative only; this "perfect" model of the shape of the region that becomes less in-focus is provided for clarity, but in practice an apparatus according to the present invention may not generate such a view.

Figure 12A:
FIG. 12A and FIG. 12B show fields of view with regions identified as being more and less in-focus.

Now with regard to FIG. 12A, first and second images are evaluated to determine whether a given element set is more or less in-focus in the second image than in the first image, based on an arrangement similar to that in FIG. 11. The relative focus may be expressed in a variety of fashions, for display and/or for future analysis. For example, as shown in FIG. 12A, each element set is assigned a simple "plus" or "minus" sign, indicating whether the element set is more in-focus in the second image (plus) or less in-focus in the second image (minus). For FIG. 12A, element sets are discriminated on the basis of whether there is any decrease at all in being in-focus. That is, given a model comparable to that in FIG. 11, would any portion of an element set be occupied by the hatched area? If so, that element set is assigned a minus.

However, such an approach to discrimination is an example only.

Figure 12B:
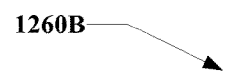

FIG. 12B shows the result of an alternative determination, also based on a model comparable to that in FIG. 11, but discriminating based on whether each element set would be at least 50% occupied by the hatched area given an arrangement similar to that shown in FIG. 11. As will be seen, a different arrangement of "plus" and "minus" signs results. Other thresholds and arrangements may be equally suitable. Moreover, it will be understood that the particular manner by which element sets are classified as either being more in-focus or less in-focus may be in part tailored to the specific approach(es) used for determining the relative change in focus.

Regardless of the particular manners, properties, and/or thresholds used, once the background is identified, the background can be subtracted, that is, removed from consideration for purposes of further analysis, or for other uses of the image(s). This may, for example, include the declaration of areas not considered background to be foreground.

The uses of background subtraction are many, and the present invention is not particularly limited to any specific use or uses of background subtraction.

A range of methods for determining relative focus may be suitable. In one embodiment, edge definition is used for that purpose. That is, the edge definition of first elements of the first image is compared with the edge definition of corresponding second elements of the second image. Second elements in the second image are determined to be more in-focus than first elements in the first image if the edge definition for the second element of the second image is greater than the edge definition for the first element of the first image. Conversely, second elements in the second image are determined to be less in-focus than first elements in the first image if the edge definition for the second element of the second image is less than the edge definition for the corresponding first element of the first image.

For the use of edge definition, a range of methods likewise may be suitable. For example, an edge may be considered to be an abrupt transition in one or more image properties. However, as the first and second images will not necessarily be sharply in focus, a more general approach than simply searching for only sharp transitions may be suitable. Rather, determining a spatial rate of change of an image property across elements (whether regions, features, or otherwise) may be more generally useful. For an element that is more in-focus, a higher spatial rate-of-change across the element is to be expected; that is to say, the more in-focus the image, the more sharp the edges. Thus, a higher rate of spatial change for a second element of the second image as compared to a first element of the first image would be indicative of the second element being more in-focus than the first element.

A range of image properties may be suitable for edge detection. For example, determining the pixel gradient may be useful for some embodiments. Other properties may include the spatial rate-of-change of image brightness, and/or the spatial rate-of-change of color. More particularly, the spatial rate-of-change of a particular color channel in a color scheme may be a suitable property. Examples would include the spatial rate-of-change of red, blue, and/or green channels in an RGB color scheme, and the spatial rate-of-change of cyan, yellow, magenta, and/or black channels in a CYMK color scheme.

The foregoing description is an example only, and other image properties may be equally suitable for edge detection. Likewise, the use of edge detection itself to determine a relative level of focus is also itself an example, and other approaches may be equally suitable.

In addition, the use of two images is also presented as an example only. It may be useful for certain embodiments to use three or more images, at three or more focal lengths.

Turning now to FIG. 13A through 13H, an arrangement using multiple images is shown schematically therein. Each of FIG. 13A through 13H shows an apparatus 1350 with a sensor 1352 and a processor 1354, imaging a subject 1356 and a background 1358 with a field of view 1360. Each image has a focal length 1368A through 1368H; these serve a similar function to the first and second focal lengths and in the example associated with FIG. 10A and FIG. 10B, though with some differences as described below.

In the embodiment shown in FIG. 13A through FIG. 13H, a total of eight images are taken. The use of eight images is an example only; more or fewer images may be used, to a minimum of two as previously described. For an image n, the focal length of image n+1 is greater than the focal length of image n.

As with the two-image arrangement previously described, the subject 1356 and background 1358 are distinguished by relative focus. However, the use of additional images allows for a higher degree of definition. In particular, the use of three or more images may provide additional data for instances where there are multiple subjects 1356, and/or where the distance of the subject(s) 1356 either is not known/cannot be estimated, or wherein it is desirable not to determine or estimate that distance.

In addition, the use of more than two images also enables ordering by distance of multiple objects at different distances. FIG. 13A through FIG. 13H show both a foreground subject 1356 and a midground subject 1357. More regarding the ordering of multiple objects by distance is presented later.

Figure 13A:
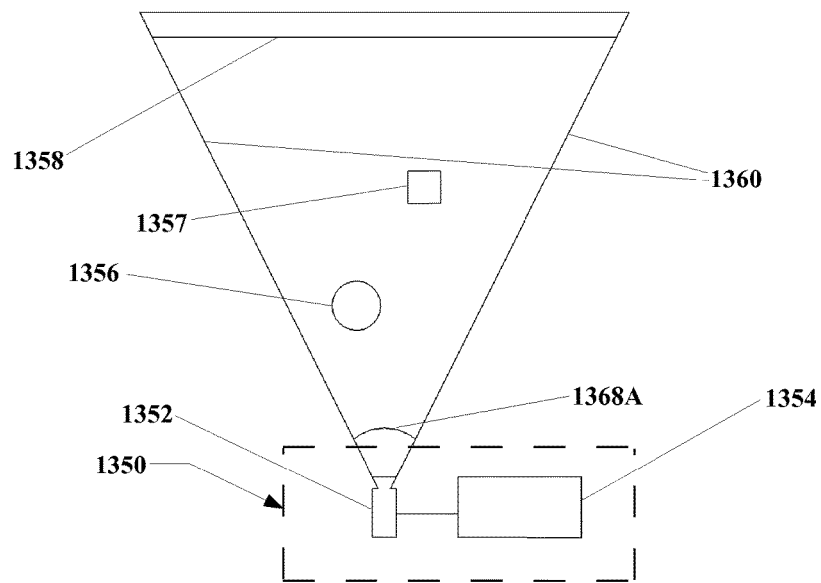
FIG. 13A through FIG. 13H show schematic illustrations of an embodiment of an apparatus in accordance with the present invention at a range of focal lengths.
Figure 13B:
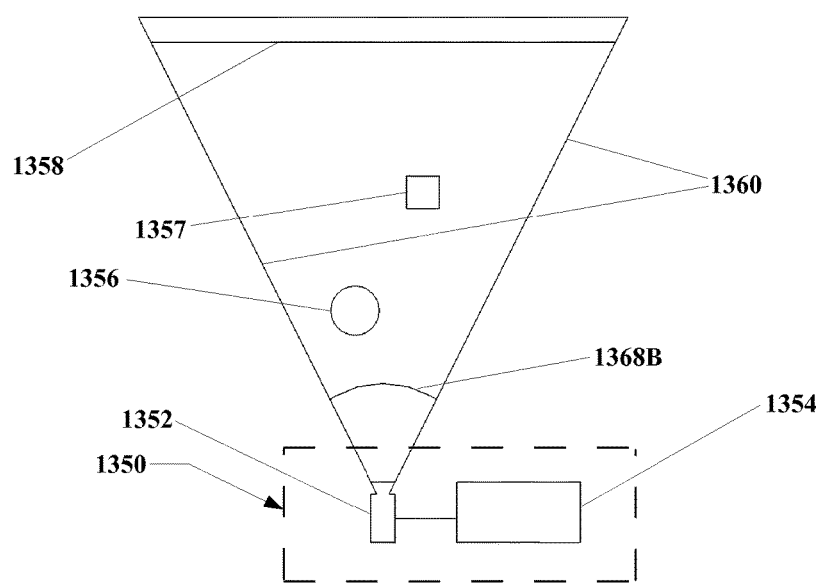
Figure 13C:
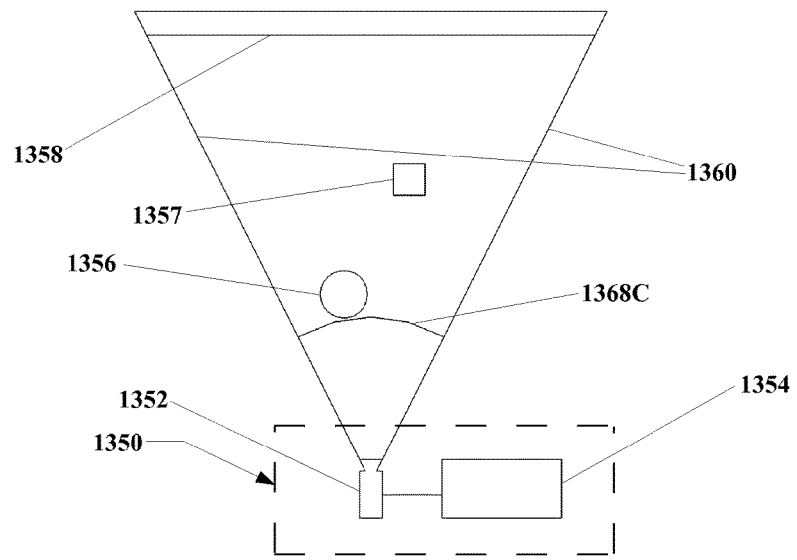
Figure 13D:
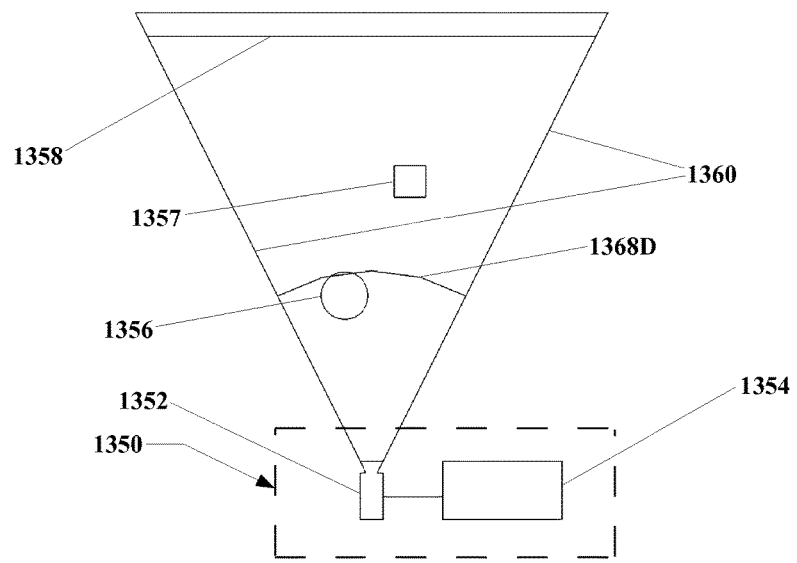
Figure 13E:
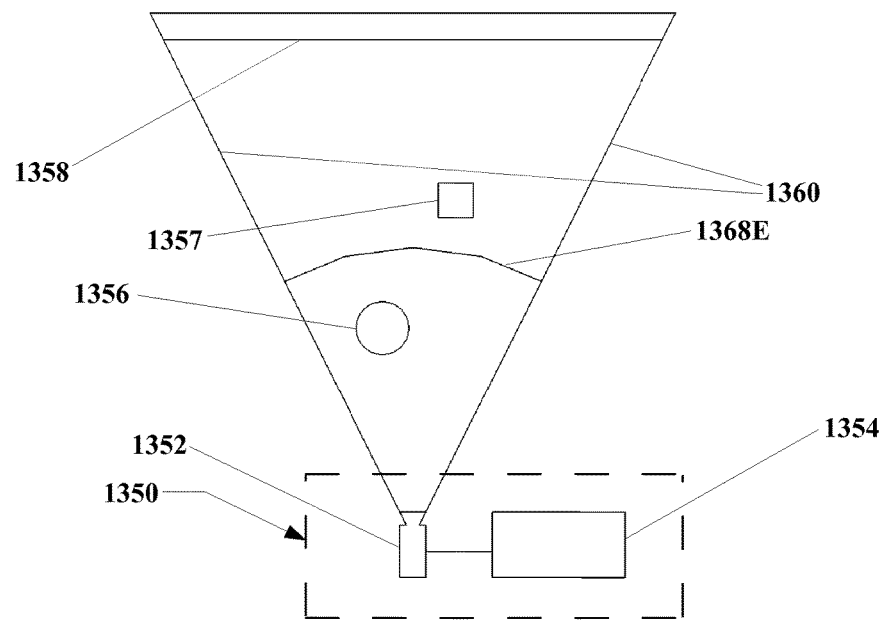
Figure 13F:
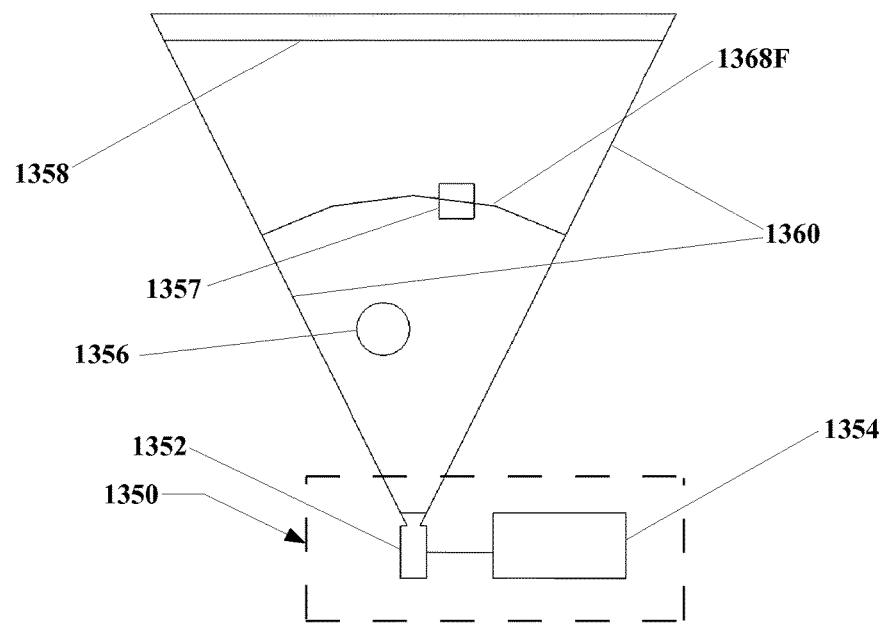
Figure 13G:
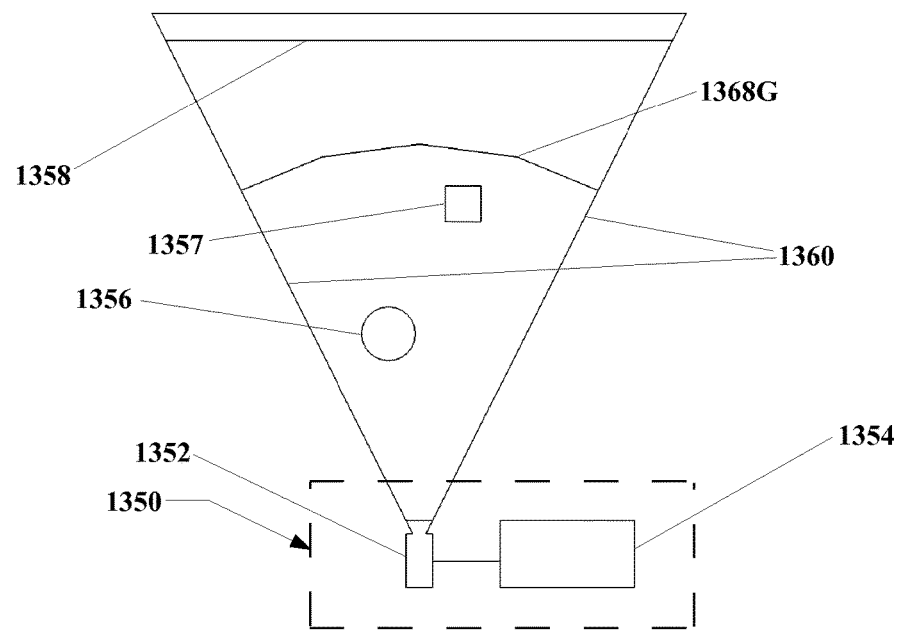
Figure 13H:
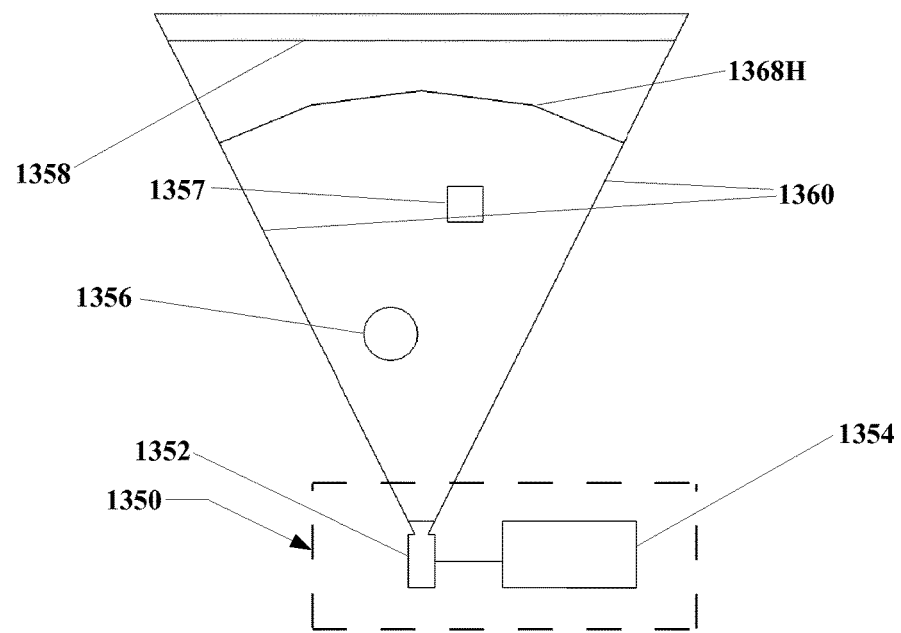
Figure 14:
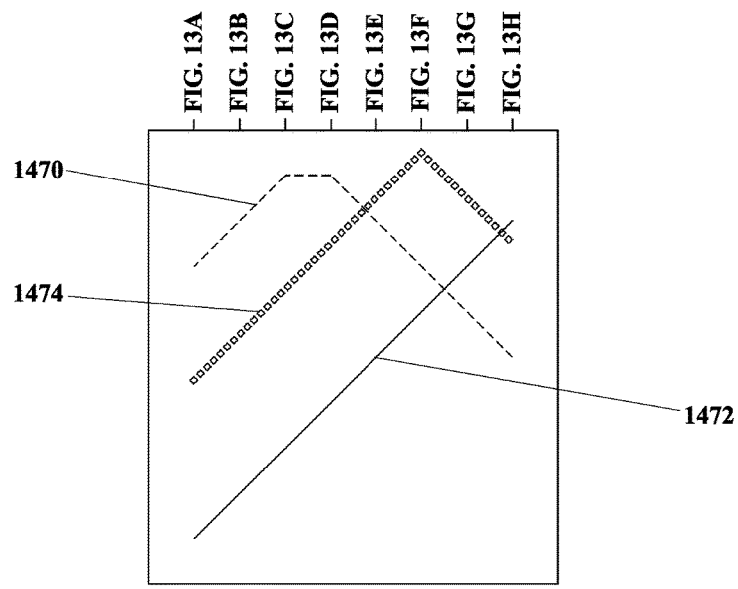
FIG. 14 shows a relative focus of foreground, midground, and background.

Turning to FIG. 14, and with regard to the matter of more highly defining distance, relative focus levels for the arrangement in FIG. 13A through FIG. 13H are plotted in FIG. 14. The dashed line in FIG. 14 represents the relative focus 1470 of the subject 1356 in FIG. 13A through FIG. 13H, while the solid line in FIG. 14 represents the relative focus 1472 of the background 1358 in FIG. 13A through FIG. 13H.

With regard to the subject 1356, the relative focus 1470 thereof as shown on the dashed line improves between FIG. 13A and FIG. 13B, as the focal length increases from that represented by 1368A to that represented by 1368B. The relative focus improves again between FIG. 13B and FIG. 1C, with the increase in focal length from 1368B to 1368C. The degree of focus of the subject 1356 then remains approximately stable between FIG. 13C and FIG. 13D, since both focal length 1368C and focal length 1368D are approximately aligned with a surface of the subject 1356, though on opposite sides of the subject 1356. Subsequently, the degree of focus of the subject 1356 decreases again between FIG. 13D and FIG. 13E, since the focal length 1368E is greater than the focal length 1368D, to the point that the focal length 1368E is beyond the subject. The images of FIG. 13F, FIG. 13G, and FIG. 13H likewise result in the subject 1356 being increasingly out-of-focus, as shown by the descent of the dashed line showing relative focus 1470 of the subject 1356.

By contrast, the solid line in FIG. 14 representing the relative focus 1472 of the background 1358 is very different. Instead of rising first and then falling, the relative focus level 1472 of the background 1358 consistently improves from one image to the next. This is because, as may be seen by comparing FIG. 13A through FIG. 13H, the focal lengths 1368A through 1368H become increasingly long, and come increasingly close to the background 1358.

Thus, a subject 1356 in the foreground can be distinguished from the background 1358 by virtue of differing relative focus as focal length is increased. A subject 1356 in the foreground typically will either become progressively less in-focus, or will become more in-focus initially but then become less in-focus. By contrast, the background 1358 typically will become progressively more in-focus as focal length increases.

Although the preceding example shown in FIG. 13A through FIG. 13H uses eight images at eight focal lengths, this is an example only. The present invention requires at least two images at two focal lengths, but is not particularly limited with respect to any maximum number of images. Regardless of the number of images, within that group of at least two images, images n+1 and n are compared with respect to relative focus (more precisely, element sets representing corresponding elements in images n+1 and n are so compared).

It will be understood that the behaviors of the present invention when used with multiple images may provide additional advantages. For example, a subject typically will exhibit improving-and-worsening or steadily-worsening focus even if the initial focal length is much closer to the sensor than the subject itself. By contrast, a background typically will show steadily improving focus from one image to the next, making the background easily distinguished from the subject(s). The use of multiple images thus may make the matter of initial focal length choice less important, so that there is less or no need to estimate or measure the distance between the subject and the sensor in advance of capturing the images.

In addition, as noted previously, the use of multiple images enables the distinction and distance ordering of multiple objects that are at different distances from the sensor.

With reference again to FIG. 13A through FIG. 13H, both a foreground subject 1356 and a midground subject 1357 are present in the field of view. It is noted that the terms "foreground" and "midground" as applied to subjects 1356 and 1357 are used here for descriptive clarity; in practice there is no rigid boundary between foreground and midground, and it could be equally suitable to consider both as foreground objects, or to consider both as midground objects.

By observing that parts of an image become more in-focus, peak at different focal lengths, and then decrease, it is possible to determine both that multiple subjects 1356 and 1357 may be present in the foreground of the images, and also their relative distances. It is noted, however, that even with the use of only two images, it is possible to determine that multiple subjects are present, even if the use of only two images does not permit ordering them by relative distance.

The point at which this peaking in focus and change in direction from improving focus to worsening focus is referred to herein as the turnaround focal length. The turnaround focal length for a particular subject 1356 or 1357 may or may not exactly match the precise distance between the imager 1352 and that particular subject 1356 or 1357, but typically will represent the focal length that is closest to the imager-to-subject distance of those focal lengths at which images are captured. For certain embodiments, the value of the turnaround focal length could be utilized for other purposes, such as determining an approximate absolute distance to a subject 1356 or 1357. However, this is not required.

Even though the turnaround focal length may not represent such a precise absolute distance, the turnaround focal length is nevertheless useful in determining relative distances to multiple subjects 1356 and 1357.

With regard particularly to the midground subject 1357, it can be seen from FIG. 13A through FIG. 13H that the focal lengths 1368A through 1368F come progressively closer to the position of the midground subject 1357. Thus, the focus of the midground subject 1357 improves between focal lengths 1368A and 1368B shown in FIG. 13A and FIG. 13B, between focal lengths 1368B and 1368C shown in FIG. 13B and FIG. 13C, and so forth. However, beginning with the difference between focal lengths 1368F and 1368G shown in FIG. 13F and FIG. 1G, the focal length moves beyond the midground subject 1357, and thus the focus worsens. Thus, the arrangement of FIG. 13F can be considered the turnaround focal length for the midground subject 1357.

The turnaround focus for the midground subject 1357 from FIG. 13A through FIG. 13H may also be seen in FIG. 14, wherein the relative focus 1474 of the midground subject 1357 is represented by the diamond line thereon. By examination of FIG. 14, it is possible to discern that the foreground subject 1356 of FIG. 13A through FIG. 13H with relative focus 1470 and the midground focus 1357 of FIG. 13A through FIG. 13H with the relative focus 1474 are both distinct from the background 1358 of FIG. 13A through FIG. 13H with relative focus 1472, based on a comparison of the relative foci 1470, 1472, and 1474 in FIG. 14. Furthermore, it can be seen that the foreground subject 1356 and the midground subject 1357 are distinct from one another based on comparison of their relative foci 1470 and 1474.

In addition, as is shown in FIG. 14, the foreground subject 1356 and the midground subject 1357 of FIG. 13A through FIG. 13H can be ordered in terms of their relative distance from the imager 1352, based on comparison of their relative foci 1470 and 1474. The turnaround focal length for the foreground subject 1356 occurs at a shorter focal length than for the midground subject 1357. Thus, the foreground subject 1356 is closer to the imager 1352 than is the midground subject 1357.

Although the ordering of content is described with respect to two subjects 1356 and 1357, this is an example only, and for certain embodiments three or more subjects may be so ordered.

It is also noted that the particular level of focus is not important to these determinations. The midground subject 1357 appears, in FIG. 14, to have a higher peak than the foreground subject 1356. That is, the relative focus 1474 of the midground subject 1357 appears to be better at its turnaround focal length the relative focus 1470 of the foreground subject 1356 at its turnaround focal length. This is presented for example only, and is incidental.

In general, the determination of relative distance can be summarized as follows.

At least two images are captured, at different focal lengths. The focus of the images is compared.

Content in the images is identified as being farthest from the imager if its focus for a focal length n+1 is greater than its focus for a focal length n, for all values of n among the images captured, with the focal length n+1 being larger than the focal length n. Typically content farthest from the imager is considered to be the background, and as such it may be subtracted from further analysis.

Content in the images is identified as being closest to the imager if its focus for a focal length n+1 is less than its focus for a focal length n, for all values of n among the images captured.

Intermediate content, which is content for which the focus at focal length n+1 is not always greater or always less than the focus at focal length n for all values of n among the images captured, is ordered according to the relative magnitude of the turnover focal length of the intermediate content. Intermediate content having a lower turnover focal length is determined to be closer to the imager than intermediate content having a higher turnover focal length.

It is noted that although the preceding general definitions are based on physical considerations, they may also to at least some degree be flexible. As noted previously, practical considerations and/or user definitions may have some effect on the particular relationships of relative focal length. For example, an extremely distant object may show no noticeable change in focus between two images both taken at relatively short focal lengths. Thus, for certain embodiments it may be useful to define content as being farthest if the focus for a focal length n+1 is greater than or substantially equal to the focus for focal length n. Other arrangements may also be equally suitable.

It is noted that depending on the choice of focal lengths, definitions, etc., it is possible for certain embodiments and certain applications thereof that no content may be determined to be closest content, and/or no content may be determined to be farthest content. Moreover, given certain choices of focal lengths, no distinction may be made between intermediate content. For example, given two objects at 0.5 m and 1 m, and a background at 10 m, and focal lengths of 0.20, 0.25, and 0.30 m, all objects would show improving focus for all comparisons of focal lengths n+1 and n. Typically a closest focal length is selected to be approximately at or beyond the closest distance at which content is intended to be resolved, and a most distant focal length is selected to be closer than the farthest distance beyond which any content except background is intended to be resolved, with any intermediate focal lengths being distributed through the distance range in which content is intended to be resolved. However, other arrangements may be equally suitable.

Figure 15:
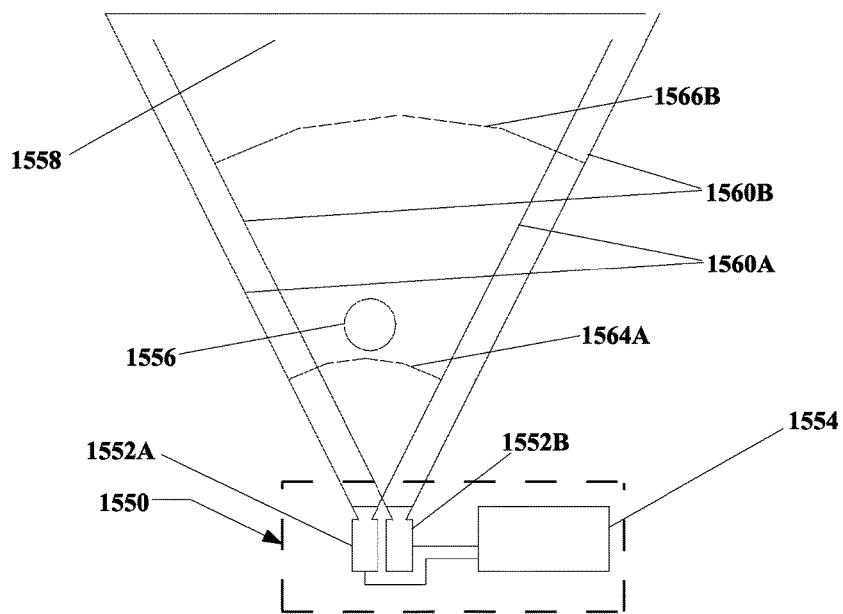
FIG. 15 shows a schematic illustration of an embodiment of an apparatus in accordance with the present invention, using parallel first and second sensors.

Turning to FIG. 15, it is noted that for simplicity the invention has been described herein mainly as having a single sensor. However, this is an example only, and arrangements with two or more sensors may be equally suitable. FIG. 15 shows an embodiment of an apparatus 1550 having first and second sensors 1552A and 1552B.

In an arrangement such as that of FIG. 15, the use of two sensors 1552A and 1552B provides additional options. While it is of course still possible to capture two images with one of the sensors 1552A and 1552B, it may be useful in some embodiments to capture a first image with one sensor 1552A, and a second image with the other sensor 1552B.

For example, with the use of multiple sensors 1552A and 1552B, and wherein each sensor 1552A and 1552B captures one image, it is possible to capture both images substantially simultaneously. As illustrated, the first sensor 1552A captures the first image at a first focal length 1564A, and the second sensor 1552B captures the second image at a second focal length 1566B. Such an arrangement can be useful, since for example it reduces the time needed to capture the images. While a single sensor might have to set to a first focal length, capture an image, reset to a second focal length, and then capture another image, the focus and capturing processes can take place in parallel when using two sensors 1552A and 1552B.

Capture speed may be improved in some embodiments wherein the first sensor 1552A is preset in advance to a first focal length 1564A, and the second sensor 1552B is preset to a second focal length 1566B. It is likewise possible in some embodiments to fix the first and second focal lengths 1564A and 1566B of the first and second sensors 1552A and 1552B. This may not only improve speed, but may also simplify the apparatus 1550 mechanically and operationally, since no system for changing focus needs to be provided.

In addition, by capturing first and second images substantially simultaneously, it is possible to avoid or at least minimize complications relating to motion of sensors, foreground objects, background objects, etc., since there is substantially no time lag between when the first and second images are captured.

Also, the use of first and second sensors 1552A and 1552B enables the generation of stereo image pairs, if the first and second sensors 1552A and 1552B are arranged at some baseline separation. Stereo imaging has numerous advantages for certain applications, including but not limited to the ability to perceive or determine depths and reconstruct a scene in three dimensions therefrom. While, as previously noted, the present invention does not require the measurement of depths or the creation of three dimensional reconstructions in order to distinguish foreground from background, the ability to implement stereo imaging or other three dimensional imaging may nevertheless be useful for certain embodiments. For example, in an embodiment that is tasked with modeling only the foreground of an image in three dimensions, the imagery obtained by first and second sensors 1552A and 1552B can be analyzed to subtract the background, and then the smaller remaining data set can be further analyzed or otherwise utilized for other purposes.

Alternatively, however, the arrangement of first and second sensors 1552A and 1552B at substantially the same position and aligned in substantially the same direction, without a substantial baseline separation between the first and second sensors 1552A and 1552B, may also be useful for certain applications. As may be seen in FIG. 15, when there is a baseline separation between first and second sensors 1552A and 1552B, the first field of view 1560A of the first sensor 1552A and the second field of view 1560B of the second sensor 1552B differ slightly from one another. In embodiments with two or more sensors 1552A and 1552B and a baseline therebetween, there are a variety of approaches for addressing this difference in field of view. For example, those portions of each field of view 1560A and 1560B that are not present in both fields of view 1560A and 1560B may be excluded from consideration. Such an arrangement would result in a field of view, for purposes of the arrangement shown in FIG. 15, made up of the intersection of the two fields of view 1560A and 1560B from the two sensors 1552A and 1552B. In such case, the effective field of view of images received from the first sensor 1552A and the effective first field of view of images received from the second sensor 1552B could be substantially identical (regardless of whether the physical fields of view of the first and second sensors 1552A and 1552B are themselves substantially identical), the field of view of both the first and second sensors 1552A and 1552B having been intersected.

Such an arrangement is an example only, and other arrangements may be equally suitable.

By placing the sensors 1552A and 1552B proximate one another, in substantially the same position, and substantially aligned with one another, the matter of differing fields of view may be avoided, since the fields of view 1560A and 1560B would then also be substantially identical. This arrangement can be useful for at least the reason that it does not require any consideration of differing fields of view, since the fields of view are, as noted, substantially identical, with any differences that might potentially exist being small enough as to be ignored altogether.

FIG. 16A through FIG. 16D show another arrangement of sensors in accordance with the present invention, wherein the sensors have substantially identical fields of view.

Figure 16A:
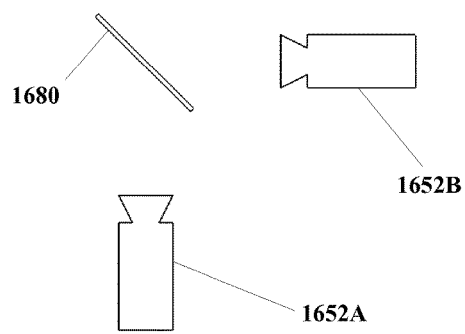
FIG. 16A through FIG. 16D each show a schematic illustration of an embodiment of an apparatus in accordance with the present invention, using a beam splitter with first and second sensors.
Figure 16B:
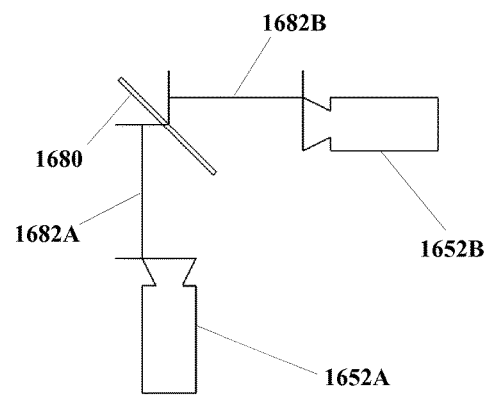

As may be seen in FIG. 16A through FIG. 16D, the arrangement therein utilizes a beam splitter. The arrangement includes first and second sensors 1652A and 1652B, with a partially silvered mirror 1680 arranged along the line of sight of both sensors 1652A and 1652B. Being partially silvered, the mirror 1680 both transmits a portion of incident light, and reflects a portion of incident light. The mirror 1680 is at an angle of approximately 45 degrees relative to each sensor 1652A and 1652B. In addition, as shown in FIG. 16B, the distance 1682A between the mirror 1680 and the first sensor 1652A is substantially equal to the distance 1682B between the mirror 1680 and the second sensor 1652B.

Figure 16C:
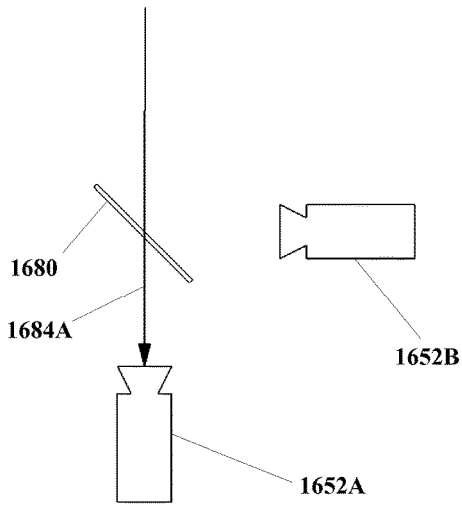
Figure 16D:
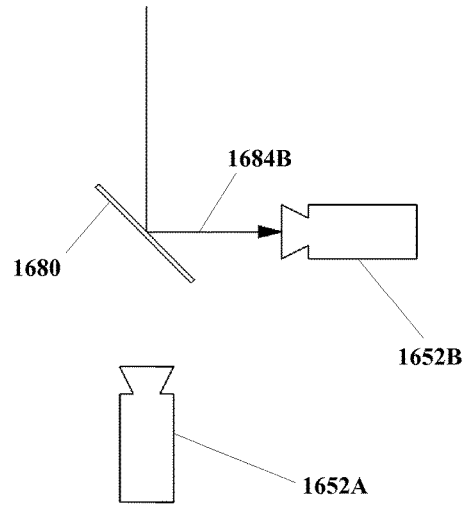

Turning to FIG. 16C and FIG. 16D, operation of the beam splitter with respect to the first sensor 1652A and second sensor 1652B is illustrated therein. In FIG. 16C, a ray of light 1684A approaches the mirror 1680; because the mirror 1680 is partially silvered, the mirror 1680 can transmit the light to the first sensor 1652A. Conversely, in FIG. 16D another ray of light 1684B approaches the mirror, and because the mirror 1680 is partially silvered, the mirror 1680 can reflect the light to the second sensor 1652B. Both the first sensor 1652A and the second sensor 1652B receive light incoming from the same direction(s), and because the distances 1682A and 1682B between the mirror and the first and second sensors 1652A and 1652B respectively are substantially equal, the first and second sensors 1652A and 1652B are at substantially equal optical distances from objects being sensed. Thus, the fields of view of the first and second sensors 1652A and 1652B are substantially identical, even though the first and second sensors 1652A and 1652B are physically pointing in different directions and are at different positions.

Other arrangements for obtaining images with substantially identical fields of view may also be equally suitable.

For example, plenoptic or "light-field" cameras obtain a data set that includes all available light passing through the lens aperture, without regard to direction or focal length. From the resulting data set, multiple images at different focal lengths can be extracted after the data set is gathered. For purposes of the present invention, first and second images at first and second focal lengths may be captured from a plenoptic data set at a time other than when the data set itself is gathered. It is noted that this still is within the scope of the present invention, in that the two subsets of image data representing two images at two different focal lengths are still being captured, even though they may be extracted at some point after (for example) a camera operator has "pushed the button" on the plenoptic camera, and even though the plenoptic camera itself may have only been activated once.

It will be understood that, given such a circumstance wherein first and second images at first and second focal lengths are captured from a plenoptic data set and wherein the plenoptic camera has been activated only once, the first and second images will represent substantially the same moment in time, and will have substantially the same field of view, since the data set from which they were extracted was captured at one time, with one field of view.

It is noted that generating a plenoptic data set may not be limited to one activation of a plenoptic camera, and that other arrangements for capturing at least two images with different focal lengths at substantially the same time and/or with substantially the same field of view may be equally suitable.

It will be understood that the use of focusing and imaging in the present invention has implications with regard to selection of imaging properties such as focal lengths, apertures, and imager resolution. These factors are in general highly dependent upon both the intended application of a particular embodiment and the details of the apparatus and/or the components making up the particular embodiment.

For example, as noted elsewhere the invention functions by determining change in relative focus between images at different focal lengths. Given this, it is often preferable that objects at different distances have clearly distinguishable differences in degrees of focus. That is, it is often preferable that images have a relatively small depth-of-field, where the depth-of-field is the range of distances at which an image appears to be in focus.

Depth-of-field is affected by numerous factors, including movement, distance between the imager and the subject, and even specific properties of the subject being imaged. However, one particularly notable relation is that of f-number to depth-of-field. Other factors being equal, decreasing the f-number for a particular imager generally decreases the depth-of-focus of images obtained using that imager. Because the f-number is defined as the focal length divided by the diameter of the aperture, the preceding relationship regarding f-number and depth-of-field in turn implies that, other factors being equal, increasing the aperture generally decreases the depth-of-field (since increasing the aperture decreases the f-number).

Thus, for a given embodiment and a selected focal length, it is often preferable that imagers have a relatively large aperture, since this in turn contributes to a relatively shallow depth-of-field. In addition, for a particular image, the ability to distinguish the degree of focus is to at least some extent a function of the resolution of that image. This may be understood by considering that the sharpness of an image is in part a function of the resolution of that image; to take an extreme case, no level of focus would make an image of 4×4 pixels sharper than can be displayed within that 4×4 pixel limit. In general, a higher resolution permits a greater potential level of distinction in relative focus. Thus, it is often preferable to have a relatively high image resolution capability.

Also, it is often preferable for arrangements using multiple imagers for the parallax between imagers to be relatively low, such that the imagers "see" similar scenes. Since parallax is a function of the baseline distance between imagers, this in turn implies that other factors being equal it is often preferable for the baseline distance between imagers to be relatively small compared to the expected distance between imagers and target objects.

However, these are general principles, and should not be considered as rigid rules. Focusing and imaging are highly dependent on the details of hardware, subject, local conditions, application, etc. Moreover, in at least some instances there may be counterbalancing factors, e.g. while increasing imager resolution may increase the ability to distinguish degree of focus, increasing imager resolution may also increase the amount of data (i.e. the number of pixesl) that must be processed, potentially increasing the processing time. Thus, selection of focal length, aperture, imager resolution, imager spacing (where relevant), and other properties must be considered on a case-by-case basis, and parameters and relationships other than those described may be equally suitable.

The above specification, examples, and data provide a complete description of the manufacture and use of the composition of the invention. Since many embodiments of the invention can be made without departing from the spirit and scope of the invention, the invention resides in the claims hereinafter appended.

We claim:
1. A method, comprising:
   obtaining a first image, the first image having a first focal length and a first field of view;
   obtaining a second image, the second image having a second focal length and a second field of view;

defining a set of elements comprising a first element of the first image and a second element of the second image, wherein the first element substantially corresponds to the second element;

determining a first rate of change of an image property of the first element;

determining a second rate of change of the image property of the second element; and assigning the set of elements to at least one category in view of a relative difference between the first rate of change and the second rate of change.

2. The method of claim 1, wherein the set of elements comprises a foreground object that is not substantially fully in-focus in either the first image or the second image.

3. The method of claim 1, wherein the first rate of change is a relative spatial rate of change of an image property of the first image and the second rate of change is a relative spatial rate of change of an image property of the first image.

4. The method of claim 3, wherein the image property comprises a pixel gradient.

5. The method of claim 3, wherein the image property comprises brightness.

6. The method of claim 3, wherein the image property comprises color.

7. The method of claim 3, wherein the image property comprises color channel value.

8. The method of claim 3, wherein the image property comprises at least one of a red channel value, a green channel value, or a blue channel value.

9. The method of 4, wherein the image property comprises at least one of a cyan channel value, a yellow channel value, a magenta channel value, or a black channel value.

10. The method of claim 1 further comprising determining a first relative degree of edge definition of the first image and a second relative degree of edge definition of the second image.

11. The method of claim 10 further comprising determining a relative spatial rate of change of the image property as indicating a relative degree of edge definition.

12. A method, comprising steps of:

obtaining a first image, the first image having a first focal length and a first field of view;

obtaining a second image, the second image having a second focal length and a second field of view, wherein the first focal length and the second focal length are different;

defining a set of elements comprising a first element of the first image and a second element of the second image, wherein the first element substantially corresponds to the second element;

comparing a first rate of change of an image property of the first element with a second rate of change of the image property of the second element; and assigning the set of elements to at least one category in view of a relative difference between the first rate of change and the second rate of change.

13. The method of claim 12, wherein the set of elements comprises a foreground object, wherein the first image and the second image are not substantially fully in-focus.

14. The method of claim 12, further comprising comparing a sign of a first relative degree of focus of first element and a second relative degree of focus of the second element.

15. The method of claim 14, wherein comparing the relative degree of the first element and the second element comprises comparing a relative spatial rate of change of the image property.

16. The method of claim 15, further comprising determining a greater relative spatial rate of change of the image property.

17. The method of claim 15, wherein the image property comprises pixel gradient.

18. The method of claim 15, wherein the image property comprises brightness.

19. The method of claim 15, wherein the image property comprises color.

20. The method of claim 15, wherein the image property comprises color channel value.

21. The method of claim 15, wherein the image property comprises at least one a red channel value, a green channel value, or blue channel value.

22. The method of claim 15, wherein the image property comprises at least one a cyan channel value, a yellow channel value, a magenta channel value, or a black channel value.

23. The method of claim 14, further comprising determining a greater relative degree the first element and the second element as indicating a greater relative degree of focus.

24. A method, comprising steps of:

obtaining a first image, the first image having a first focal length and a first field of view;

obtaining a second image, the second image having a second focal length and a second field of view;

determining the second focal length is greater than the first focal length;

defining a set of elements comprising a first element of the first image and a second element of the second image, wherein the first element substantially corresponds to the second element;

determining a first rate of change of an image property of the first element;

determining a second rate of change of the image property of the second element; and assigning the set of elements to at least one category in view of a relative difference between the first rate of change and the second rate of change.

* * * * *